(12) United States Patent
Stonehocker et al.

(10) Patent No.: US 6,480,107 B2
(45) Date of Patent: Nov. 12, 2002

(54) APPARATUS FOR ASSEMBLY OF BRAKE MONITOR

(75) Inventors: Terry L. Stonehocker, Anderson, SC (US); R. Ryan Moore, Easley, SC (US); Paul S. Osterman, Eugene, OR (US); Walter E. Heron, Veneta, OR (US)

(73) Assignee: Indian Head Industries, Inc., Charlotte, NC (US)

( * ) Notice: Subject to any disclaimer, the term of this patent is extended or adjusted under 35 U.S.C. 154(b) by 0 days.

(21) Appl. No.: 09/952,825

(22) Filed: Sep. 14, 2001

(65) Prior Publication Data

US 2002/0075147 A1 Jun. 20, 2002

Related U.S. Application Data

(60) Continuation-in-part of application No. 09/894,622, filed on Jun. 28, 2001, now Pat. No. 6,417,768, which is a division of application No. 09/512,504, filed on Feb. 24, 2000, now Pat. No. 6,255,941.

(51) Int. Cl.[7] ................................................. B60Q 1/44
(52) U.S. Cl. ........................ 340/479; 340/453; 340/454; 188/1.11 W; 188/1.11 E
(58) Field of Search ................................ 340/479, 453, 340/454, 452, 450.1; 188/1.11 E, 1.11 W

(56) References Cited

U.S. PATENT DOCUMENTS

| | | | |
|---|---|---|---|
| 3,571,800 A | 3/1971 | Taylor et al. | 340/166 |
| 3,622,926 A | 11/1971 | Risk | 335/205 |
| 1,302,928 A | 1/1973 | Page et al. | 66/2 |
| 3,805,228 A | 4/1974 | Peeples | 340/52 |
| 3,845,430 A | 10/1974 | Petkewicz et al. | 335/108 |
| 4,364,011 A | 12/1982 | Bloomfield et al. | 324/174 |
| 4,468,650 A | 8/1984 | Barbee | 340/58 |
| 4,476,449 A | 10/1984 | Gray et al. | 335/138 |
| 4,642,603 A | 2/1987 | Martinez, Jr. | 340/52 |
| 4,674,338 A | 6/1987 | Carpenter | 73/861.77 |
| 4,757,300 A | 7/1988 | Sebalos | 340/52 |
| 4,914,916 A | 4/1990 | Leigh-Monstevens et al. | 60/534 |
| 4,937,554 A | 6/1990 | Herman | 340/453 |

(List continued on next page.)

FOREIGN PATENT DOCUMENTS

GB 130928 1/1973 ...................... 66/2

*Primary Examiner*—Daryl Pope
(74) *Attorney, Agent, or Firm*—Howard & Howard

(57) ABSTRACT

An apparatus for assembling a brake monitor upon a brake actuator, wherein the brake monitor includes an annular push rod sleeve having a first sensor element, preferably a magnet, and a second sensor element fixed relative to the brake actuator housing. The installation apparatus includes a push rod sleeve adjustment member which supports the push rod sleeve and movable by a servomotor, a programmable logic controller (PLC), preferably including an analog card, operably connected to the second sensor element including a power supply having a predetermined voltage. The PLC controls the servomotor to adjust the axial position of the push rod sleeve on the push rod until the second sensor element senses a predetermined voltage, and the apparatus then fixes the push rod sleeve on the push rod. The installation apparatus also locates an annular sensor sleeve within the brake actuator housing and disposes the push rod through the sensor sleeve and aligns the components of the housing, push rod, return spring, etc.

24 Claims, 12 Drawing Sheets

U.S. PATENT DOCUMENTS

| | | | |
|---|---|---|---|
| 4,960,036 A | 10/1990 | Gummer et al. | 92/63 |
| 5,087,907 A | 2/1992 | Weiler et al. | 340/454 |
| 5,266,917 A | 11/1993 | Bleeke et al. | 338/32 |
| 5,285,190 A | 2/1994 | Humphreys et al. | 340/453 |
| 5,302,939 A | 4/1994 | Downs et al. | 340/447 |
| 5,310,023 A | 5/1994 | Martinez | 188/1.11 |
| 5,320,198 A | 6/1994 | Hoyt et al. | 188/1.11 |
| 5,322,641 A | 6/1994 | Shiel et al. | 252/514 |
| 5,339,069 A | 8/1994 | Penner et al. | 340/454 |
| 5,394,137 A | 2/1995 | Orshek | 340/453 |
| 5,433,296 A | 7/1995 | Webberley | 188/1.11 |
| 5,450,930 A | 9/1995 | Martens et al. | 188/1.11 |
| 5,472,539 A | 12/1995 | Saia et al. | 156/155 |
| 5,545,368 A | 8/1996 | Vinarcik | 264/437 |
| 5,572,187 A | 11/1996 | Williford | 340/454 |
| 5,825,287 A | 10/1998 | Zarybnicky, Sr. et al. | 340/453 |
| 6,255,941 B1 | 7/2001 | Osterman et al. | 340/479 |

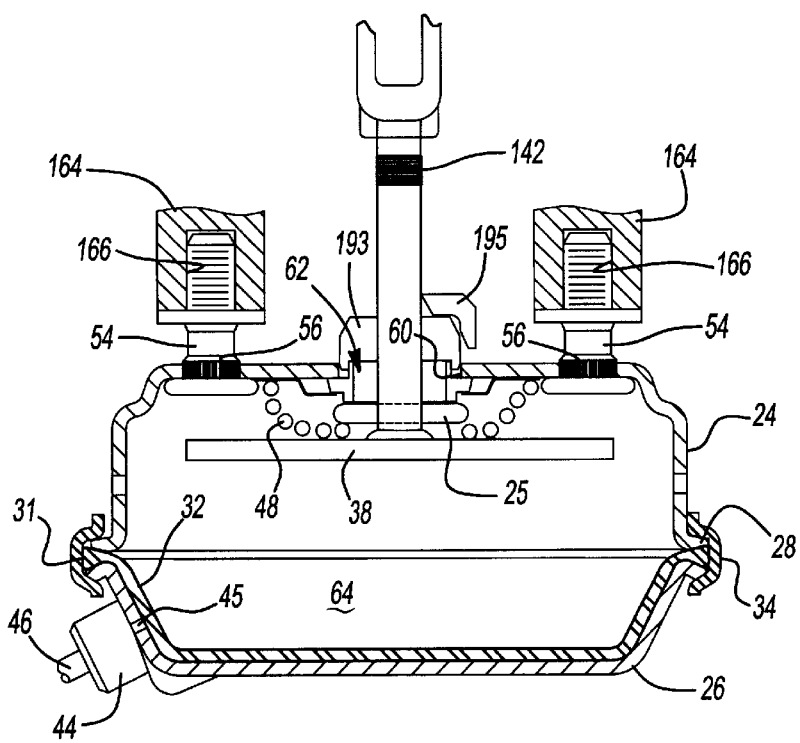
*Fig-9*
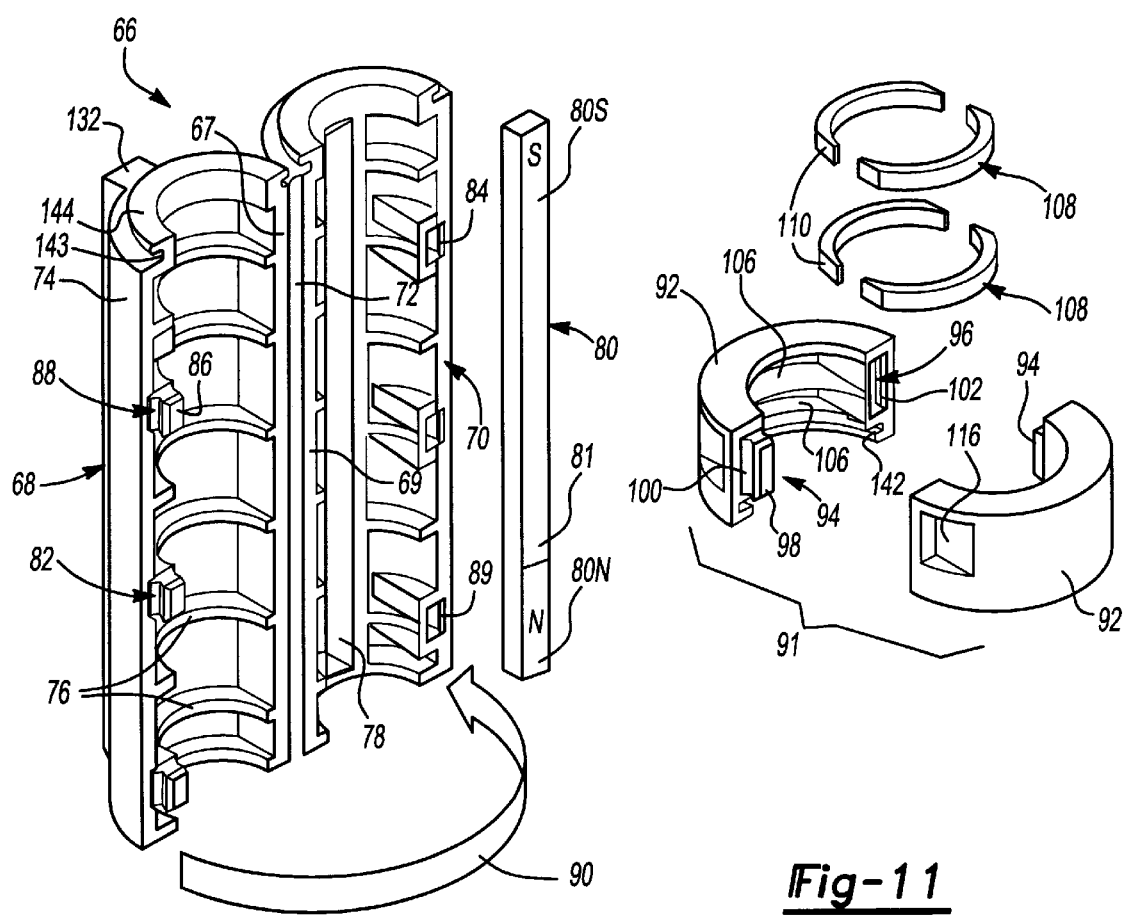
*Fig-10*
*Fig-11*

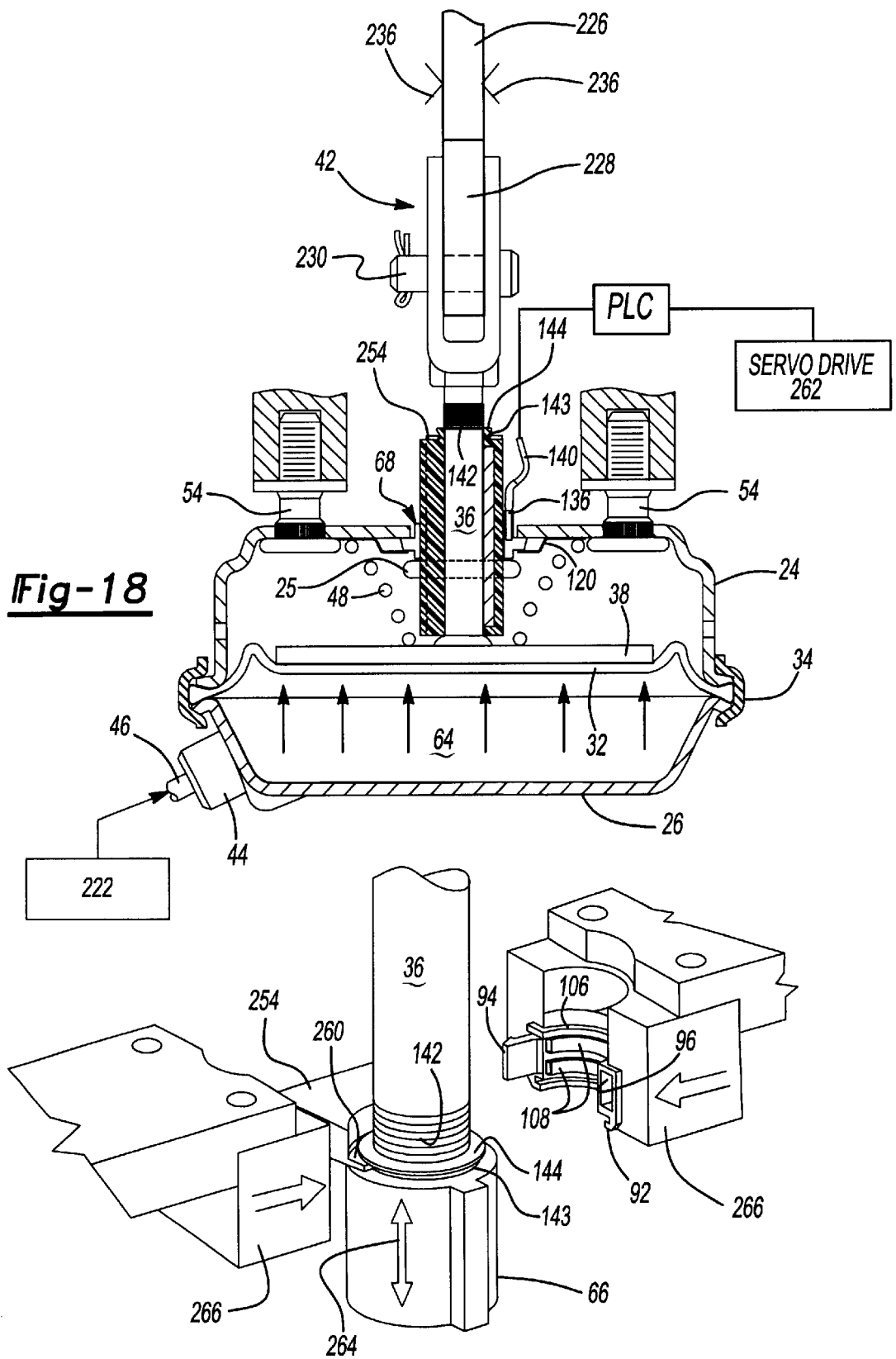

APPARATUS FOR ASSEMBLY OF BRAKE MONITOR

This Application is a continuation-in-part application of Ser. No. 09/894,622 filed Jun. 28, 2001, now U.S. Pat. No. 6,417,768 which application was a divisional application of Ser. No. 09/512,504 filed Feb. 24, 2000, now U.S. Pat. No. 6,255,941.

FIELD OF THE INVENTION

The present invention relates to an apparatus for assembly of a brake monitor on a brake actuator of the type used for heavy vehicles, including tractor and trailer combinations, buses and the like, having a brake actuator.

BACKGROUND OF THE INVENTION

Heavy-duty trucks, buses and other large vehicles are typically equipped with a pneumatic brake actuating system. The brake actuating system typically applies air under pressure to a service chamber of a brake actuator to move a diaphragm in a first direction. A piston having a push rod typically moves with the diaphragm and the push rod is connected to a linkage which actuates the vehicle brakes. An emergency chamber having a power spring and a second diaphragm is typically mounted on the service chamber and is operable to move the push rod and actuate the brakes in the event that the pneumatic vehicle system fails or when the vehicle is turned off when the vehicle is parked. Thus, the emergency chamber serves as an emergency braking system for the vehicle and a parking brake.

A brake actuator has a predetermined amount of available movement of the push rod or stroke of the push rod. The amount of movement of the push rod required to fully actuate the braking system of the vehicle should be carefully monitored, such that it is within the stroke of the push rod of the brake actuator. Excessive movement of the push rod can be created by one of several factors. Typically, excessive movement of the push rod is due to brake lining wear. As the brakes wear, more movement of the push rod is required to actuate the brakes. Further, if the linkages and connections between the push rod and the linkages, et cetera, bend or become loose or excessively worn, additional push rod movement is required to actuate the brakes. A combination of these several factors may sometimes cause the amount of push rod movement required to actuate the brakes approach the available push rod movement or stroke available from the brake actuator. As will be understood, this is an undesirable situation.

The prior art has proposed various methods and apparatus to monitor the push rod movement during actuation of the brake and provide some indication to operator or service personnel as to when there is excessive push rod movement, which is referred to as "overstroke." As will be understood by those skilled in this art, a determination of when there is excessive push rod movement or overstroke is dependent upon the designed or rated stroke of the brake actuator. For example, the push rod of a typical brake actuator may include a brightly colored ring, which may also be painted on the push rod, which indicates an overstroke condition when the ring extends out of the brake actuator during actuation of the brakes. The ring may, however, be difficult to see because of the location of the brake actuators beneath the truck or trailer and accumulated road debris. Automatic slack adjusters located between the push rod and the foundation brake are also conventionally used, wherein the slack adjuster incrementally adjusts to compensate for slack in the braking system and to decrease the required push rod movement.

The prior art has also proposed various electronic monitoring systems which generally monitor either the stroke of the push rod or the movement of the linkages between the push rod and the foundation brake including the slack adjuster. However, there are several obstacles to be overcome. First, powering and monitoring electronic indicators on each brake actuator of an 18-wheel vehicle is costly. Further, the hostile environment in which the brake actuators are mounted beneath the vehicle can damage the monitoring system, particularly where there are exposed pistons, sleeves, sensors, et cetera. Finally, where the stroke of the push rod is monitored by the brake monitoring system, it is essential that the push rod stroke monitoring system be accurately assembled on the brake actuator and be able to withstand the hostile environment of the brake actuator. Finally, it is desirable that the components of the brake monitoring system be accurately assembled on the brake actuator.

The vehicle brake monitoring system disclosed herein and in the above-referenced co-pending patent application solves many of these problems by providing a reliable and relatively inexpensive brake monitor which is incorporated into and becomes part of the vehicle brake actuator. By incorporating the brake monitoring system in the brake actuator, the components are protected, providing greater reliability and reduced cost. The brake monitoring system includes a push rod sleeve which incorporates a first sensor element and a second sensor element is fixed relative to the housing to provide accurate location of the push rod to sense an overstroke condition and may be utilized to sense other brake conditions including a worn brake, a dragging brake condition and a normally functioning braking system. In the preferred embodiment, the first sensor element incorporated in the push rod sleeve is an elongated magnet, most preferably a magnet having north and south poles, and a "null" point spaced between the north and south poles, and the second sensor element is a Hall-effect sensor which is most preferably located in a sensor sleeve which surrounds the push rod sleeve. The sensor sleeve may be located within the brake actuator housing and most preferably also serves as a stone shield preventing entry of foreign material into the brake actuator housing.

As will be understood by those skilled in this art, the accurate location of the magnet in the push rod sleeve on the push rod is critical to accurate monitoring of the push rod stroke. Because of the normal tolerances of vehicle brake actuators, it is critical to adjust the push rod sleeve on the push rod relative to the second sensor element on each brake actuator for reliable performance of the brake monitoring system. Another problem associated with brake monitoring systems for brake actuators is that there are at least three standard strokes for brake actuators which must be taken in to account when assembling the brake monitoring system on the brake actuator. The apparatus for assembling a brake monitor on a brake actuator of this invention assures accurate location of the push rod sleeve and first sensor element on the push rod relative to the second sensor element and may be utilized to assemble a brake monitor on brake actuators having different push rod strokes. The apparatus of this invention thereby assures accurate and reliable operation of the brake monitoring system.

SUMMARY OF THE INVENTION

The apparatus for assembling a brake monitor on a brake actuator of this invention may be used with any conventional brake actuator, wherein the brake actuator includes a housing having an end wall, an opening through the end wall and a reciprocating piston within the housing having a push rod extending through the opening in the housing end wall for actuation of a vehicle brake, particularly pneumatic brake actuating systems for heavy duty trucks, buses, trailers and other large vehicles. As set forth above, a typical brake actuator for heavy duty vehicles includes an enclosed housing, a flexible diaphragm generally having a peripheral edge secured between the housing members, a piston having a piston plate biased against the flexible diaphragm by a return spring and the piston includes a push rod which reciprocates through an opening in the end wall of the brake actuator housing to actuate the vehicle braking system. The brake actuator housing is connected to the pneumatic braking system of the vehicle whereby, upon actuation of the vehicle pneumatic braking system, the diaphragm is driven against the piston plate, which reciprocates the push rod to actuate the vehicle foundation brake. As will be understood by those skilled in this art, the brake actuator may also include an emergency or power spring chamber which actuates the vehicle braking system when the vehicle pneumatic pressure falls below a predetermined pressure or when the vehicle is turned off, serving as a parking brake.

As set forth above, the preferred embodiment of the brake monitor includes an annular push rod sleeve which surrounds the push rod having a first sensor element and which has slideable adjustment on the push rod to accurately locate the first sensor element in the push rod sleeve relative to a second sensor element fixed relative to the housing. In the preferred embodiment, the first sensor element is an elongated magnet preferably having north and south poles and a null point between the north and south poles, wherein the magnet field is zero. In the most preferred embodiment of the brake monitoring system, the annular push rod sleeve is comprised of two semicircular components integrally hinged for ease of assembly and the second sensor element is incorporated in a sensor sleeve surrounding the push rod sleeve which most preferably also serves as a stone shield for the brake actuator.

The apparatus for assembling a brake monitor on a brake actuator of this invention accurately positions and fixes the first sensor element in the push rod sleeve on the push rod relative to the second sensor element of the brake monitoring system thereby assuring accurate monitoring of the installation brake actuator. The apparatus includes an adjustment clamp member which releasably supports the push rod sleeve on the push rod which is moveable by a servomotor relative to the housing and the push rod, a programmable logic controller (PLC) which is operably connected to the second sensor element fixed relative to the brake actuator housing and includes a power supply having a predetermined voltage. The PLC then controls a servomotor to adjust the axial position of the sleeve on the push rod, thereby aligning the first and second sensor elements to a predetermined voltage. That is, the PLC controls the servomotor to accurately align the first and second sensor elements of the brake monitoring system to assure accurate monitoring of the stroke of the brake actuator.

As set forth above, in the preferred embodiment of the brake monitoring system, the first sensor element is an elongated magnet extending longitudinally in the push rod sleeve and the second sensor element is a Hall-effect sensor, wherein the PLC of the apparatus includes an analog card, and wherein the Hall-effect sensor continuously "reads" the voltage of the magnet as the push rod sleeve is adjusted axially on the push rod by the servomotor connected to the PLC. The installation apparatus then fixes the sleeve on the push rod when the predetermined voltage is sensed by the Hall-effect sensor. In the most preferred embodiment, the installation apparatus fixes the sleeve on the push rod by attaching a lock nut on the sleeve and the push rod, permanently attaching the sleeve on the push rod. As set forth above, in the most preferred embodiment, the magnet includes north and south poles and a null point spaced from one of the poles and the apparatus adjusts the sleeve axially on the push rod until the Hall-effect sensor reads the null point.

The installation apparatus further includes a reciprocal sleeve clamp configured to receive the sleeve and the sleeve clamp extends to the push rod and places the sleeve around the push rod. In the preferred apparatus, the housing chamber is first pressurized by the installation apparatus to extend the push rod through the end wall opening and the sleeve clamp is then extended to receive the push rod sleeve on the push rod. In the most preferred embodiment, where the sleeve comprises two generally semicircular sleeve components hinged along one edge portion, the sleeve clamp is configured to receive the push rod sleeve in an open configuration and the installation apparatus then reciprocates to place the push rod sleeve in the open configuration around the push rod and then closes and clamps the sleeve around the push rod, wherein the sleeve is then slideably positioned on the push rod for calibration as described above. In the most preferred embodiment, the push rod sleeve includes a radial key and the sensor sleeve includes a keyway which slideably receives the radial key of the sleeve, such that the first sensor element in the push rod sleeve is aligned with the second sensor element fixed relative to the housing during calibration.

In the preferred embodiment of the installation apparatus, the sensor sleeve is mounted within the housing in the opening through which the push rod extends prior to receipt of the push rod. The installation apparatus of this invention then inserts the push rod through the sensor sleeve and compresses the piston or push rod plate against the return spring and locks the push rod in the extended position prior to final assembly of the brake actuator and receipt of the push rod sleeve and calibration as described above. The installation apparatus for assembling a brake monitor on a brake actuator of this invention therefore assures reliable assembly and calibration of the brake monitoring system, preventing error and assuring reliable monitoring of the brake actuator. Other advantages and meritorious features of this invention will be more fully understood from the following description of the preferred embodiments, the appended claims and the drawings, a brief description of which follows.

BRIEF DESCRIPTION OF THE DRAWINGS

FIG. 9 is a side partially crosssectioned view of the assembled brake actuator prior to receipt and calibration of the further components of the brake monitor;

FIG. 10 is a side perspective view of a preferred embodiment of the push rod sleeve;

FIG. 11 is a side perspective view of a lock nut utilized for fixing the push rod sleeve on the push rods of the brake actuator;

FIG. 18 illustrates a further step in the assembly of a brake monitor on a brake actuator performed by the assembly apparatus illustrated in FIG. 12;

FIG. 19 illustrates a further step in the assembly of a brake monitor on a brake actuator performed by the assembly apparatus of FIG. 12.

DETAILED DESCRIPTION OF A PREFERRED EMBODIMENT

Figure 20:
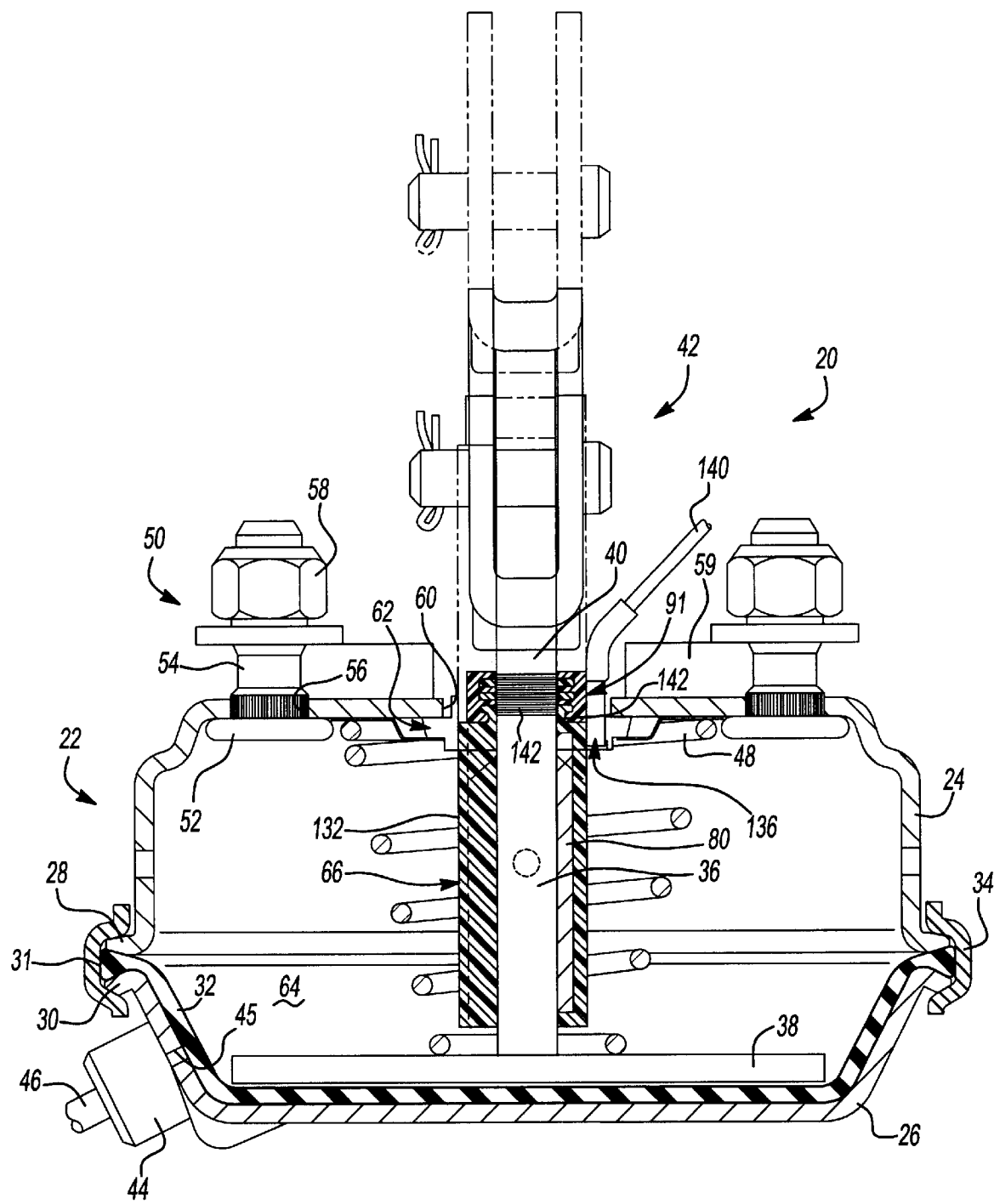
FIG. 20 is a partial crosssectional view of a completed brake actuator having a preferred embodiment of the brake monitoring system of this invention.

Prior to describing the preferred embodiments of the apparatus for assembling a brake monitor on a brake actuator of this invention, reference is made to FIG. 20 which discloses a conventional brake actuator for heavy vehicles and a preferred embodiment of a brake monitoring system illustrated at 20. As will be understood, however, the brake monitoring system and assembly apparatus of this invention may be utilized for assembly of a brake monitoring system for any conventional brake actuator including conventional brake actuators having a rolling diaphragm, piston-type brake actuators and "double diaphragm" brake actuators having a "non-pressure" chamber or brake actuator as shown in FIG. 20 and a spring or emergency chamber (not shown) which may be formed and assembled as an integral assembly as disclosed, for example, in U.S. Pat. No. 4,960,036 assigned to the assignee of the present application.

A brake actuator 20 as illustrated in FIG. 20 conventionally includes a housing 22 which, in the disclosed embodiment, includes a cup-shaped case 24 and a cup-shaped cover 26. The case 24 includes a radial flange 28 and the cover includes an opposed radial flange 30. The rim portion 31 of the flexible diaphragm 32 is received between the flange portions 28 and 30 of the case 24 and cover 26, respectively, and the flange portions are clamped together by a clamp band 34. During assembly of the brake actuator, the flange portions 28 and 30 are pressed together against the rim portion 31 of the flexible diaphragm 32 and clamped in place by the clamp 34. The clamp 34 may be a conventional bolted clamp band as known in the prior art or a continuous ring which is deformed in place to permanently secure the cover 26 on the case 24 after assembly of the brake actuator as disclosed in the above referenced U.S. Pat. No. 4,960,036.

The push rod 36 includes a piston plate 38 which is biased against the central portion of the diaphragm 32 by return spring 48. The free end 40 of the push rod 36 includes a clevis 42 for attachment of the push rod 36 of the brake actuator to a foundation brake linkage or slack adjuster attached to the vehicle foundation brake (not shown). The brake actuator is rigidly secured generally to a bracket 59 adjacent the vehicle foundation brake by mounting bolts 50. The mounting bolts 50 include a head portion 52 and a shank portion 54 which extend through openings 56 in the case 24. The case is then secured to the bracket 59 by nuts 58 which are threadably received on the threaded end portion of the shank 54. The case 24 includes an opening 60 which receives the reciprocal push rod 36 and a sensor sleeve which, in the disclosed embodiment also serves as a stone shield 62, is located in the case 24 surrounding the opening 60 as described hereinbelow.

A pneumatic connector 44 is connected to the pneumatic braking system of the vehicle (not shown) by line 46. Upon actuation of the vehicle brakes, air under pressure is received through line 46, which applies pressure through port 45, driving the diaphragm 32 upwardly in FIG. 20 against the piston plate 38 and the return spring 48. The cup-shaped diaphragm 32 inverts against the piston plate 38, driving the push rod 36 through the opening 60 in the case 24, actuating the foundation brakes of the vehicle (not shown). In a typical heavy-duty vehicle, the depression of the brake pedal (not shown) pressurizes the line 46, which drives the diaphragm to invert and actuate the foundation brake of the vehicle (not shown). Upon release of the brake pedal, the pressure in line 46 returns to zero and the return spring 48 pushes the piston plate 38 downwardly in FIG. 20 to return the diaphragm to the position shown in FIG. 20. As will be understood, brake actuators 20 of the type shown in FIG. 20 may be mounted in any orientation, generally beneath a truck or the trailer, wherein each axle includes a brake actuator as shown. In a typical application, however, the brake actuator assembly may also include an emergency chamber (not shown) generally mounted in piggyback on the service chamber shown. In such applications, the cover 26 may be replaced by a flange case which defines a service chamber 64 and an emergency chamber (not shown) and the emergency chamber is enclosed by a separate cover as disclosed more fully in the above referenced U.S. Pat. No. 4,960,036. As will be understood, however, the brake monitoring system of this invention is not limited to the type or configuration of the brake actuator. For example, the brake actuator may be a double diaphragm brake actuator, a piston-type brake actuator having annular seals or a rolling diaphragm.

The brake monitoring system assembled by the apparatus of this invention is specifically adapted to monitor the position of the push rod 36 as it reciprocates through the opening 60 in the housing 22 shown in FIG. 20. The preferred embodiment of the brake monitoring system is adapted to monitor several conditions of the brake actuator including overstroke, wherein the push rod 36 extends beyond the intended or rated limit of the stroke indicating, for example, a worn brake, a dragging brake condition, wherein the push rod does not return to the ready position shown in FIG. 20, a nonfunctioning brake actuator and a normal stroke condition. The preferred embodiment of the brake monitoring system may also be utilized to monitor the continuous movement of the push rod 36 during its stroke or braking cycle.

The push rod sleeve assembly 66 of the vehicle brake monitor system can best be understood from the exploded view of FIG. 10. The integral sleeve 66 includes opposed sleeve portions 68 and 70, which are generally semicircular in cross-section, and an integral flexible hinge portion 72 which extends longitudinally and integrally joins the adjacent sides 67 and 69 of the sleeve portions 68 and 70, respectively. As will be understood from the following description of the assembly, one or the other of the opposed sleeve portions 68 and 70 may extend slightly greater than one half of a circle (semicircular), such that one of the sleeve portions snaps on the push rod 36, provided the combination of the two sleeve portions define an annular sleeve which surrounds the push rod. Each of the generally semicircular sleeve portions 68 and 70 include a generally semicircular body portion 74 and radial generally semicircular ribs 76 which are longitudinally spaced and integral with the body portion 74. A longitudinally extending pocket 78 is defined in one of the opposed sleeve portions 70 which receives the magnet 80 described more fully herein below. One of the sleeve portions 68 and 70 further includes integral male connectors 82 and the other of the sleeve portions 70 include socket-like female connectors 84. The male connectors 82 each include an enlarged head 86 and a groove 88 beneath the head and the female connectors each include internal ribs 89 which receive and lock the head portions 86 in the female connectors 84, such that the male and female connectors 82 and 84 permanently interconnect the open sides of the sleeve portions 68 and 70 when the sleeve 66 is received around the push rod 36 as shown by arrow 90 and in FIG. 10.

The push rod sleeve is fixed on the push rod by an adjustable clamp 91 (see FIG. 11) by identical generally semicircular clamp members 92. The clamp members each include an integral male connector 94 and a female socket or connector 96. The male connectors 94 each include an enlarged head portion 98 and a groove 100 adjacent the head. The female connectors each include a plurality of ribs 102 which receives the head 98 of the male connectors 94 to permanently connect the clamp members. Each of the identical clamp members 92 also include generally semicircular pockets 106 which receive the generally semicircular locking inserts 108. In the preferred embodiment, each of the locking inserts includes flat end portions 110 which are slideably received and aligned in the slots of the semicircular pockets, accurately aligning the locking inserts in the pockets as described in the above identified related application.

Figure 3:
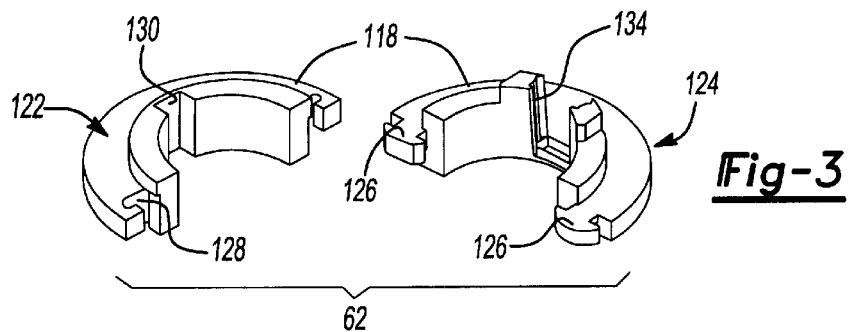
FIG. 3 is a side perspective view of a preferred embodiment of the sensor sleeve of the brake monitor.
Figure 16:
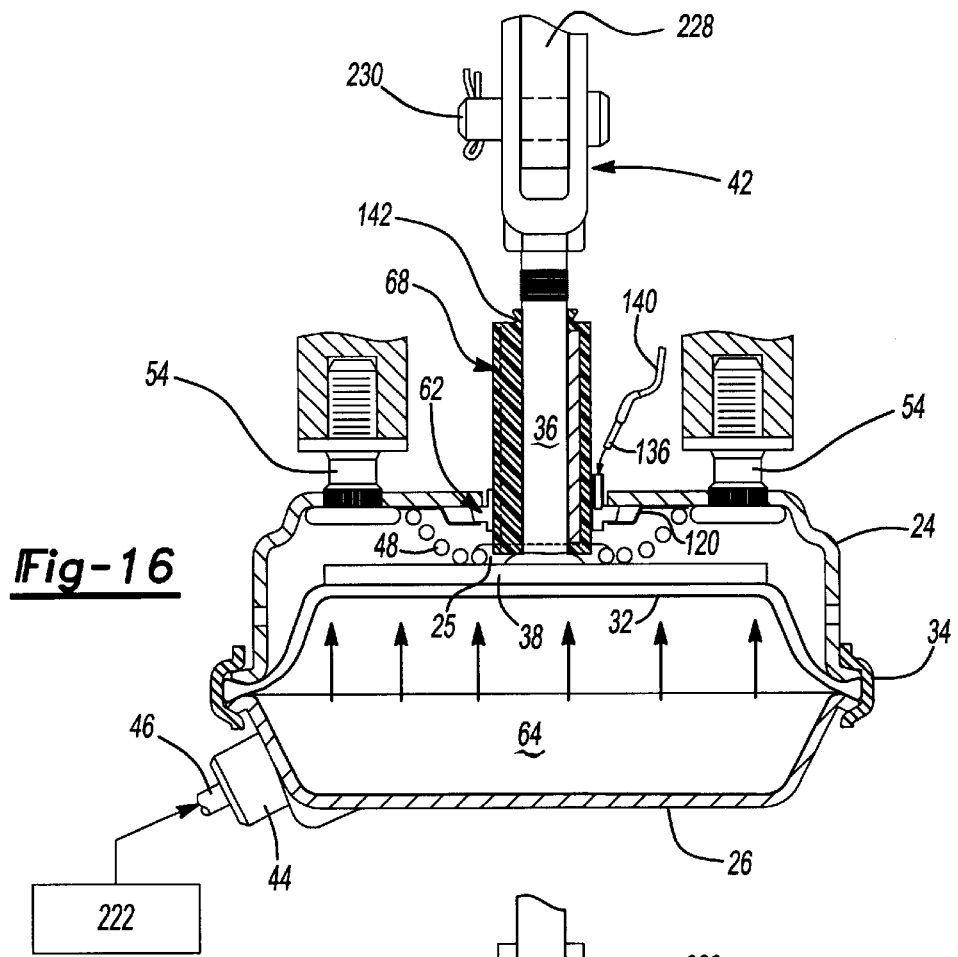
FIGS. 16 and 17 illustrate further steps performed by the assembly apparatus shown in FIG. 12.

The sensor sleeve 62 which, may also serve as a stone shield as described above, includes a radial portion 118 which overlies the inside surface of the cup-shaped case 24 as best shown in FIGS. 3 and 20. In the preferred embodiment, the stone shield 62 is formed of two generally semicircular components 122 and 124 as shown in FIG. 3. One of the components 124 includes integral male connector portions 126 and the other of the components 122 includes female connector portions 128. Further, one of the components of the stone shield 62 includes a longitudinal slot or keyway 130 and the push rod sleeve 66 includes a radial longitudinally extending rib or key 132 as shown in FIG. 10 and 20. As described below, the longitudinally extending key 132 of the annular sleeve 66 is slideably received in the keyway 130 of the stone shield 62. The other component includes a slot 134 as shown in FIG. 3 which receives the sensor assembly 136 as shown in FIG. 16. As described above, the sensor in the sensor sleeve 62 is preferably a Hall-effect sensor 136 shown in FIGS. 16 to 18. The sensor is connected to the assembly apparatus by wire 140 described below and monitoring system of the vehicle following installation.

Figure 1:
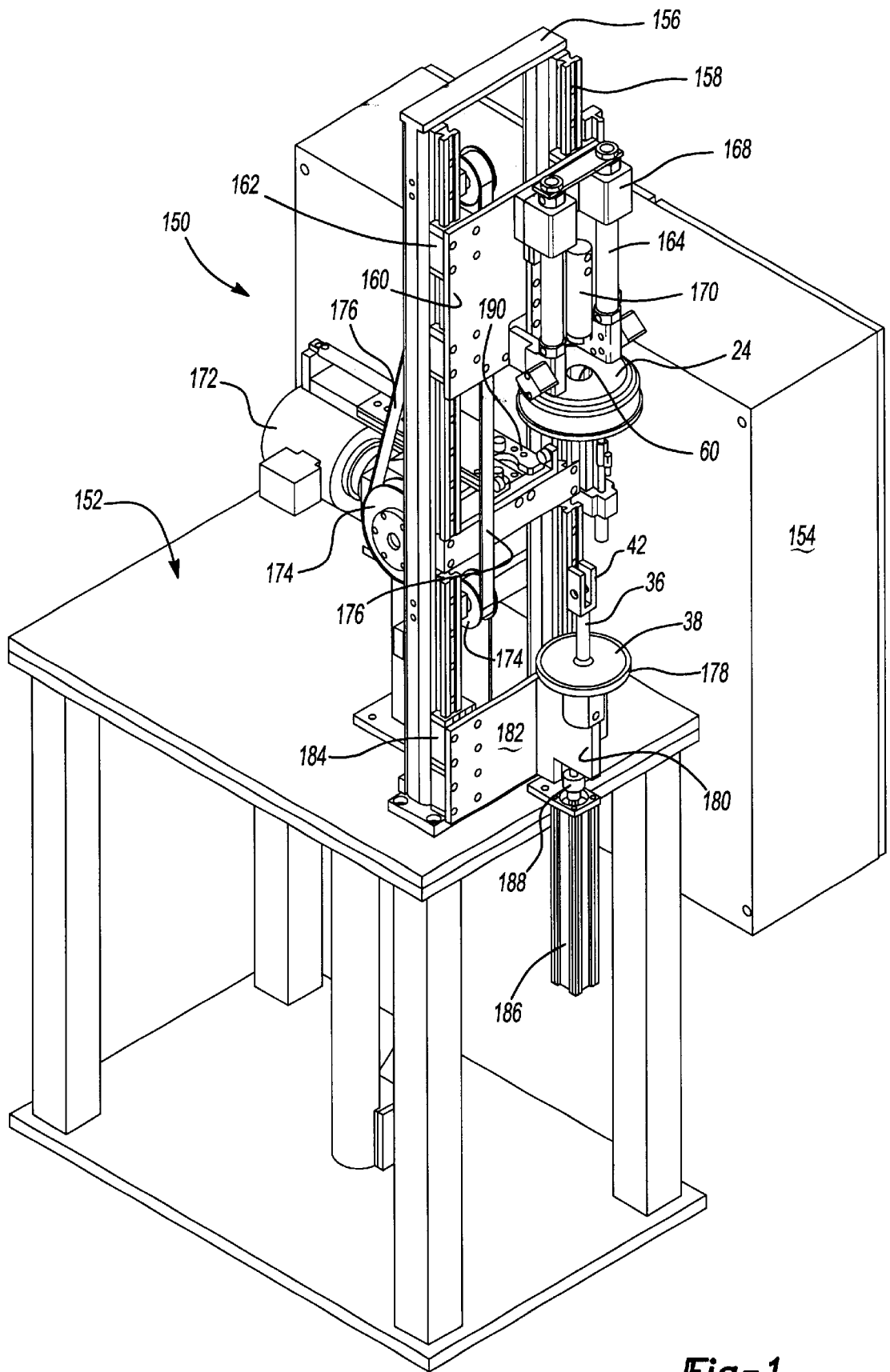
FIG. 1 is a perspective view of the first station of the apparatus for assembly of a brake monitor on a brake actuator of this invention.
Figure 2:
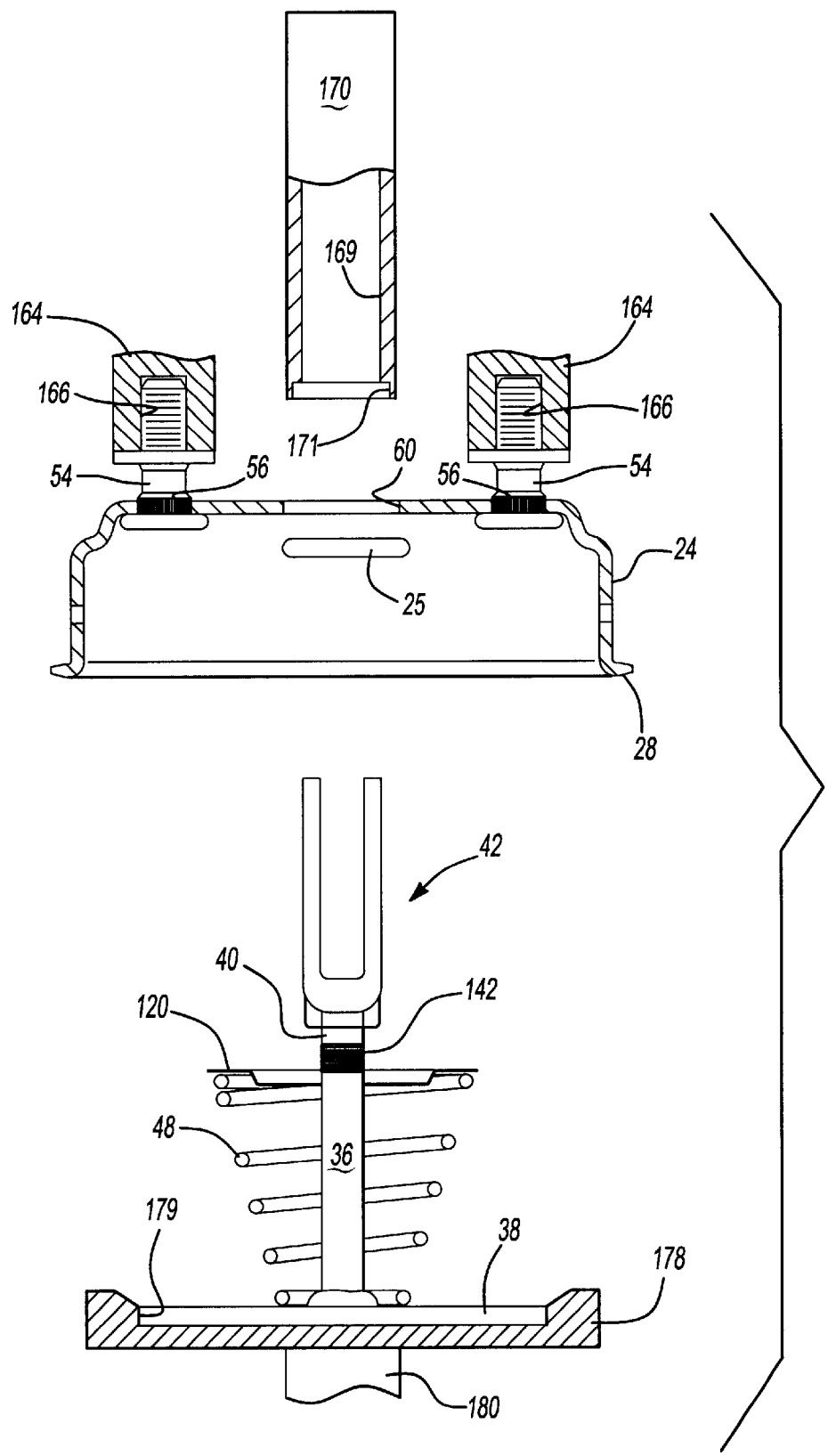
FIG. 2 is a partial crosssectional view of components of the assembly apparatus illustrated in FIG. 1 with a partially assembled brake actuator.

FIG. 1 illustrates a first or preassembly station 150 of the apparatus for assembly of a brake monitor on a brake actuator of the general type disclosed in FIG. 20. The first station 150 of the apparatus includes a table support 152 having a control box 154 and a stanchion 156 having vertical rails 158 which slideably supports a vertical platform 160 on slides 162. A housing member 24 of a brake actuator having an opening 60 through the end wall is supported on the vertical platform 160 by rods 164 each having a threaded bore 166 which threadably receive the threaded end of the mounting bolts 54 of the brake actuator as shown in FIG. 2. The rods 164 are supported on brackets 168 and a sensor sleeve bracket 170 is similarly supported on the vertical platform 160 by suitable fasteners (not shown). The vertical platform may be raised and lowered by electric motor 172 which rotates a plurality of pulleys 174 and belts 176 which form no part of the present invention. A piston plate 38 having a push rod 36 and clevis 42 is supported on a piston support 178, which is supported by bracket 180 on a second vertical platform 182 mounted on slides 184 on the rails 158. The piston support 178 may be raised and lowered by pneumatic piston 186 having a reciprocably piston rod 188. Thus, the brake actuator housing 24 may be raised and lowered by motor 172 and the brake actuator piston plate 138 may be raised and lowered by pneumatic piston 186.

Figure 4:
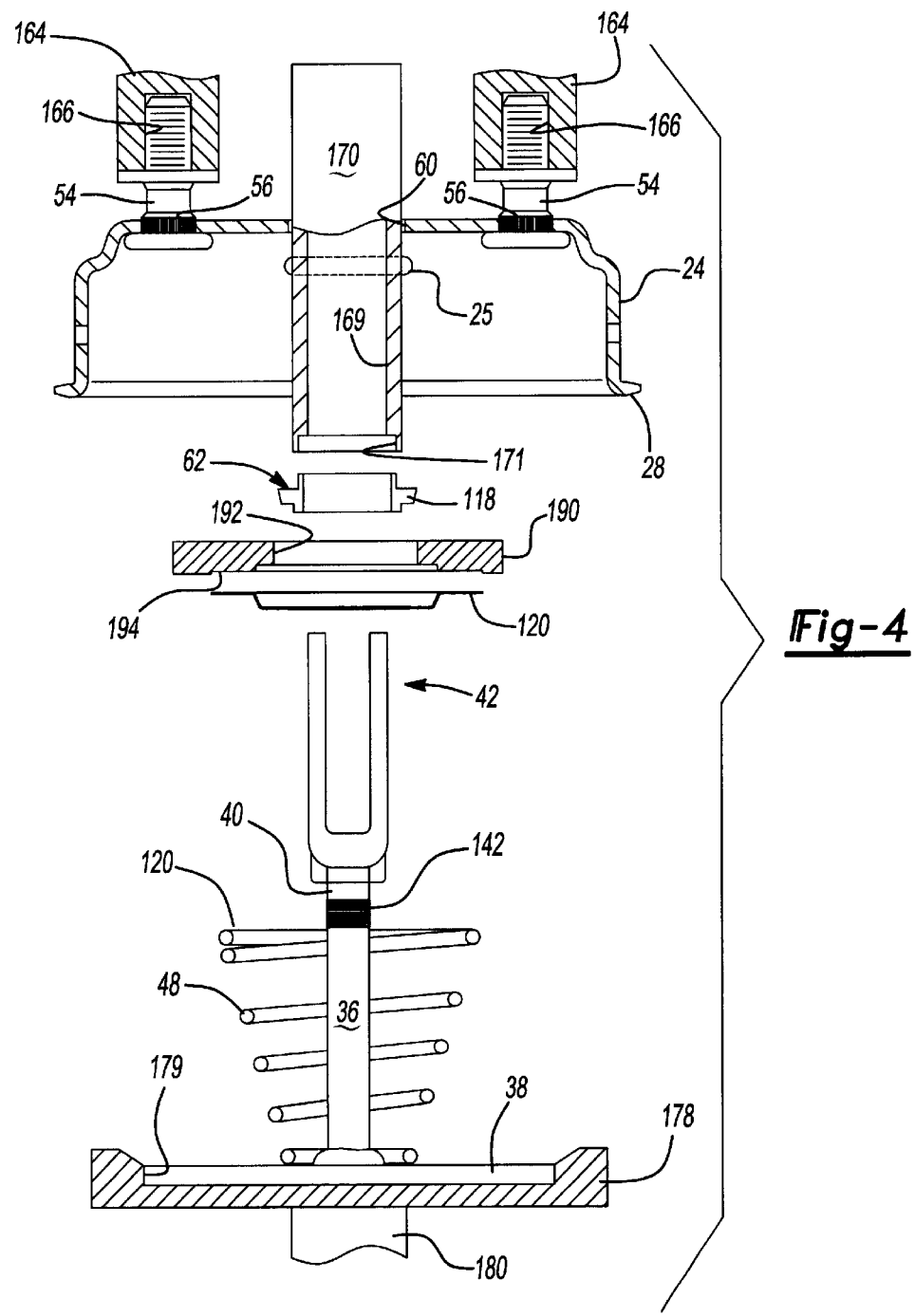
FIG. 4 is a side partially crosssectioned view similar to FIG. 2 illustrating assembly of the sensor sleeve in the brake actuator.
Figure 5:
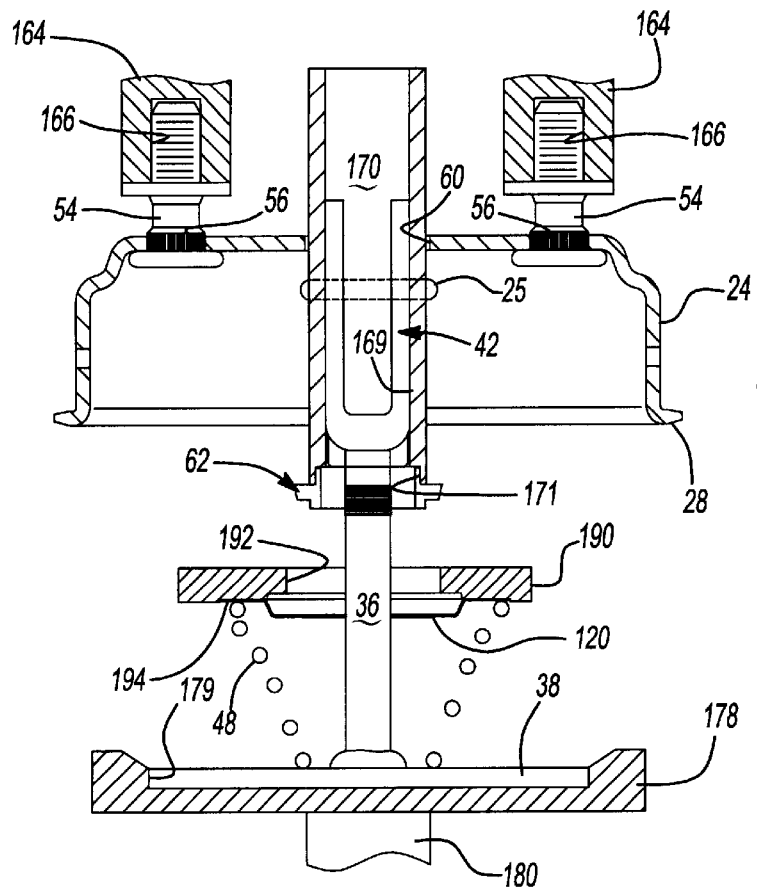
FIGS. 5 and 6 illustrate assembly of components of the brake actuator and sensor sleeve illustrated in FIG. 4.
Figure 6:
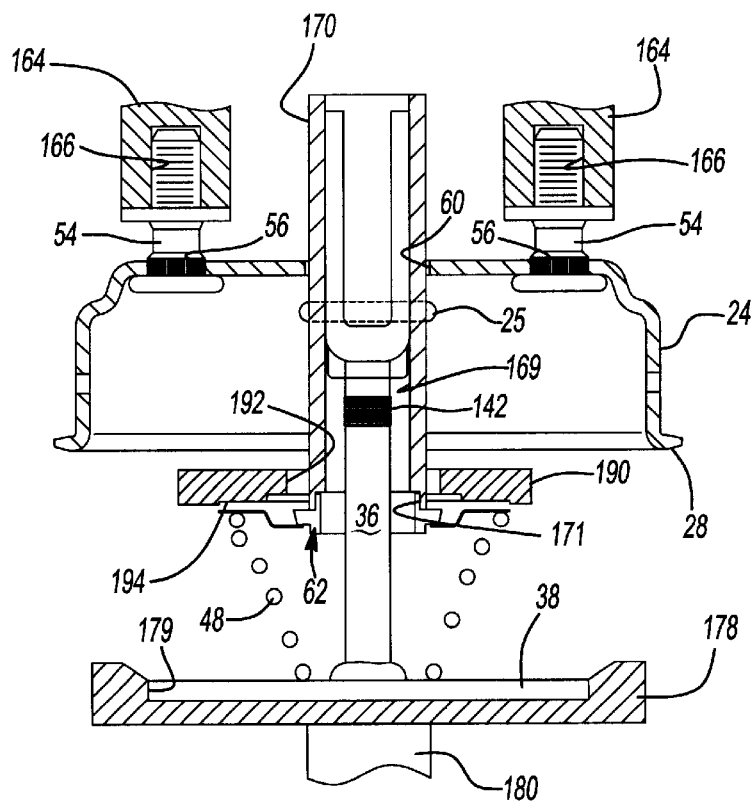
Figure 7:
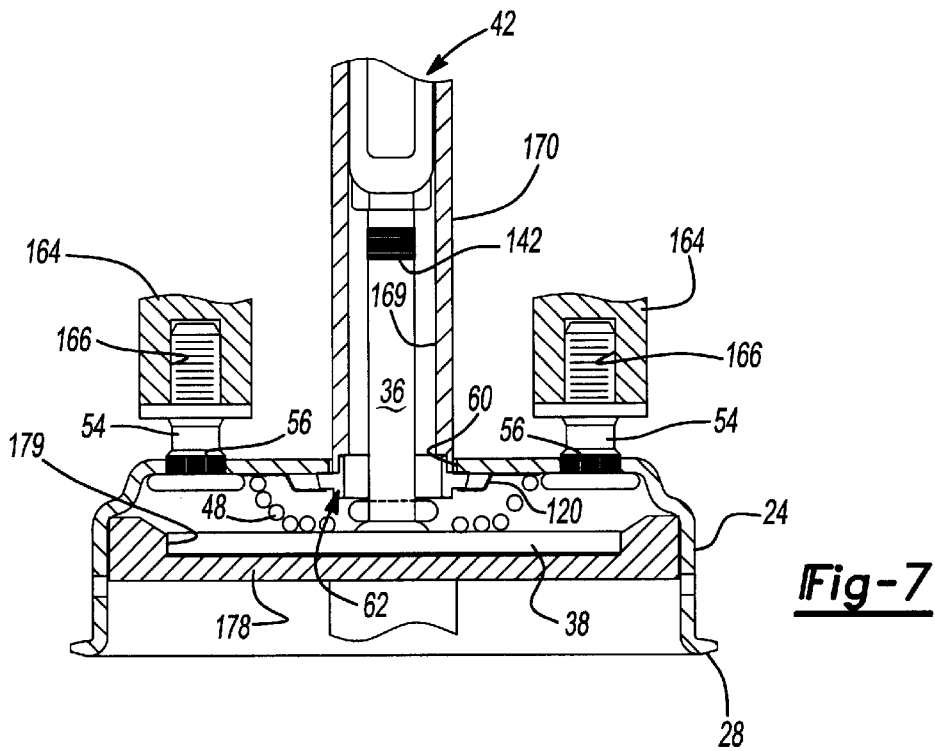
FIGS. 7 and 8 illustrate further steps in the assembly of the brake actuator by the assembly apparatus shown in FIG. 1.
Figure 8:
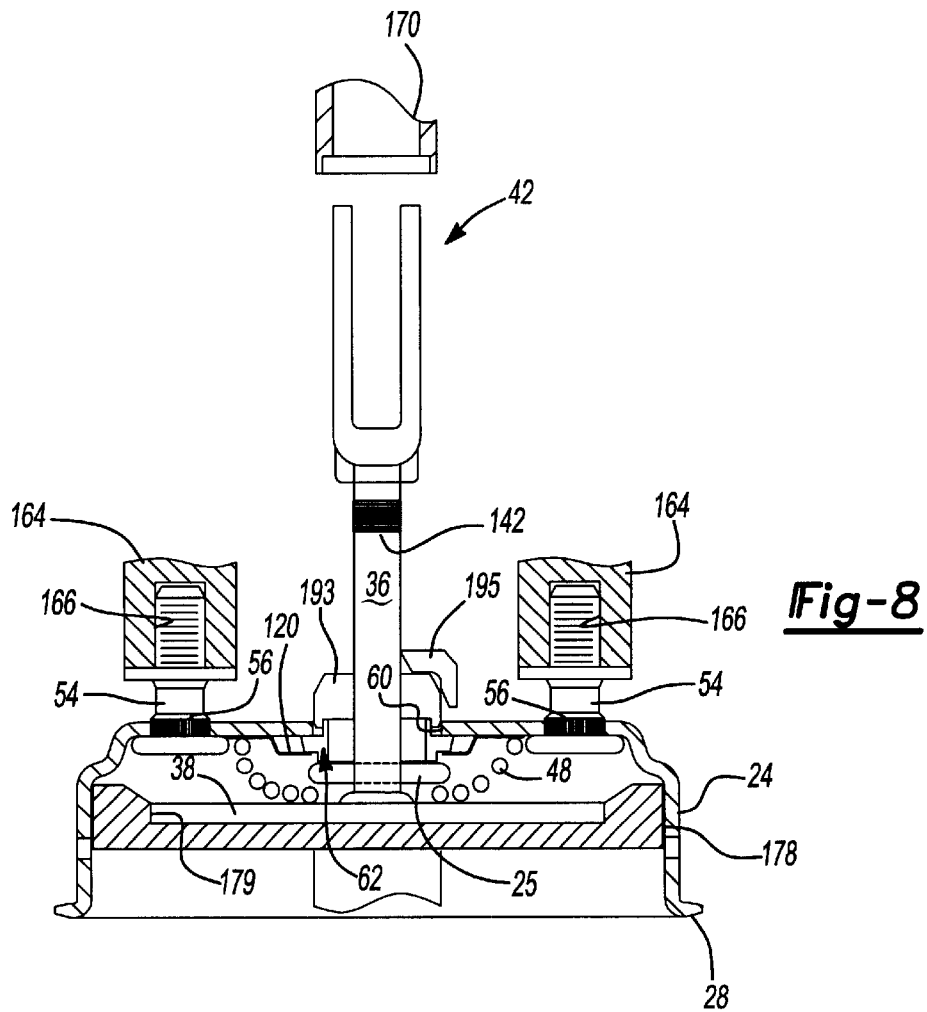

As shown in FIG. 2, the piston plate 38 is supported in an opening 179 in the piston support 178 on bracket 180. The components of the brake actuator piston or push rod assembly are then preassembled on the piston plate 38, including the return spring 48 and a stone shield retainer 120, also shown in FIG. 2. The sensor sleeve bracket 170 includes an opening 171 configured to receive and retain the sensor sleeve 62 shown in FIG. 3 as best shown in FIG. 4. As described above, the sensor sleeve or stone shield 62 in this embodiment of the brake monitor is comprised of two generally semi circular components 122 and 124, wherein one component (124) includes male connectors 126 and the other component (122) includes female connectors 128. One component (122) also includes a keyway which slideably receives the radial rib or key 132 of the push rod sleeve and the other component (124) includes a slot 134 which receives a sensor, preferably a Hall-effect sensor as described further below. The assembled components 122 and 124 of the sensor sleeve 62 are received in the configured opening 171 of the sensor sleeve or tube bracket 170 and retained by a friction fit as shown in FIG. 5. The first station of the assembly apparatus further includes an extendable support member 190 having an opening 193 which receives the clevis 42 of the push rod 36 and a recess 194 as shown in FIG. 5 configured to receive the retainer plate 120 as best shown in FIG. 5. As will be understood, the clevis is first received in the bore 169 of the sensor sleeve bracket 170 prior to receipt of the sensor sleeve 62 as best shown in FIGS. 4 and 5. The installation apparatus 20 shown in FIG. 1 may now be utilized to align and secure the piston assembly for completion of the assembly of the brake actuator and install the sensor sleeve as now described in regard to FIGS. 6 to 8. The sensor sleeve 62 is installed in the opening 60 in the housing 24 by movement of the upper vertical platform 160 on rails 158 and the return spring 48 is compressed against the piston plate 38 by the support member 190 by moving the lower or second vertical platform 182 upwardly as shown in FIG. 7. The assembly may then be clamped in place by clamp member 193 having a finger release 195 as shown in FIG. 8.

The remaining components of the brake actuator 20 may then be assembled in a conventional assembly apparatus (not shown) as shown in FIG. 9. That is, the radial lip portion 31 of the flexible diaphragm 32 is received on the radial rim 28 of the housing member 24, the lip portion 30 of the cup-shaped cover 26 is received on the lip portion 31 of the diaphragm and the cover is secured in place by a clamp band 34 as described above. The brake actuator 20 is now ready for receipt and calibration of the push rod sleeve 66 in the second assembly station 196 shown in FIG. 12, which is the final assembly and calibration station.

The second assembly station 196 shown in FIG. 12 includes a table support 198, a control box 200 including a programmable logic controller or PLC having an analogue card as described below, a control panel 202 having a touch screen control 204. The assembly apparatus is supported on vertical stanchions 206 having vertical rails 208 and 244 which adjustably receives the vertical platform and bracket assemblies 210 and 242 on slides 212 and 246 further described below. The horizontal plate and bracket assembly 216 may be raised and lowered by pneumatic piston 214. The assembled brake actuator 20 is supported by and attached to horizontal plate and bracket assembly 216 by pneumatic pistons 218. As shown in FIG. 15, the horizontal plate includes configured notches 220 which receive the mounting bolts 54 of the brake actuator 20 and the piston rods of the pneumatic pistons 218 engage the mounting bolts 54, rigidly supporting the brake actuator 20. As set forth above, the assembly station 196 is adapted to place the push rod sleeve 66 on the push rod 36, adjust the location of the push rod sleeve on the push rod or "calibrate" the sensor elements and fix the push rod sleeve on the push rod for accurate monitoring of the brake actuator. The operation of the assembly and calibration apparatus 96 will now be explained with reference to FIGS. 13 to 19, wherein further components and operation of the apparatus 196 shown in FIG. 12 will be explained.

Figure 13:
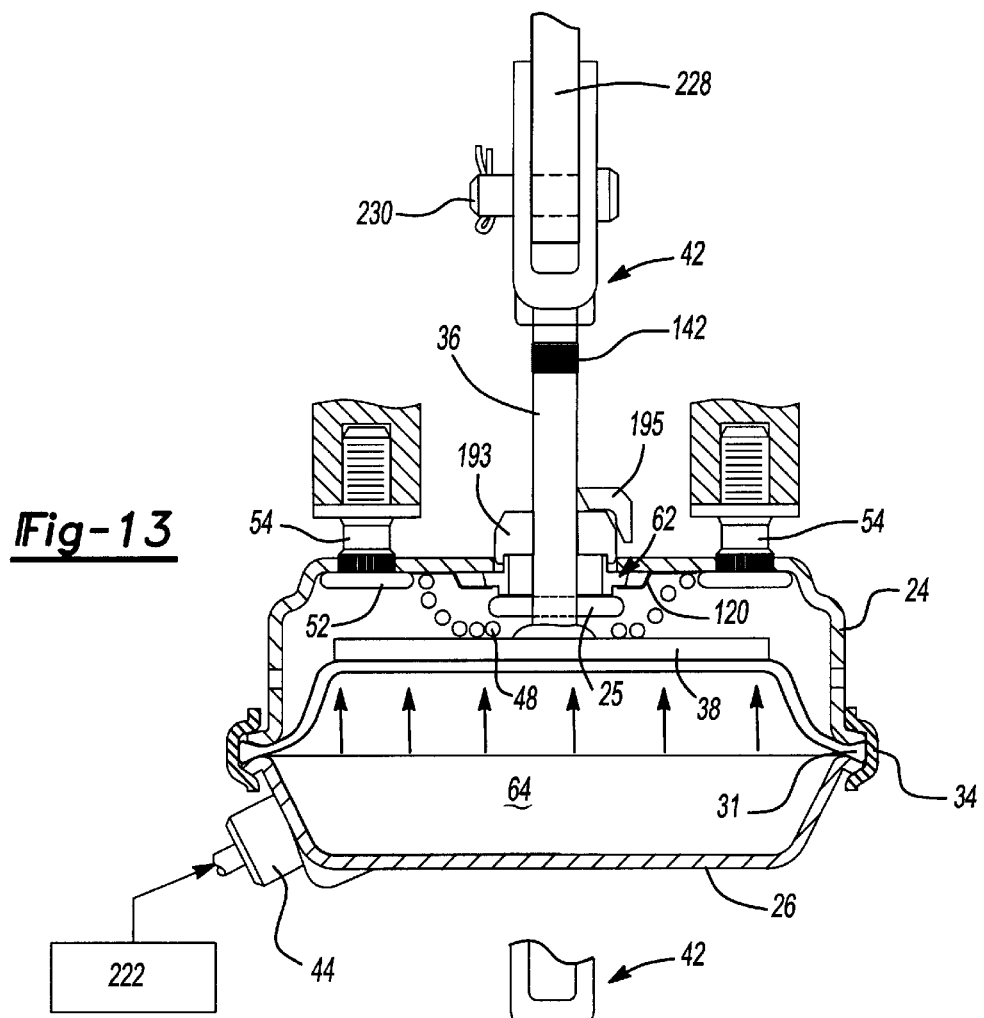
FIG. 13 is a partially side crosssectioned view of a brake actuator illustrating a first step in the assembly of a brake monitor on a brake actuator by the assembly apparatus illustrated in FIG. 12.
Figure 14:
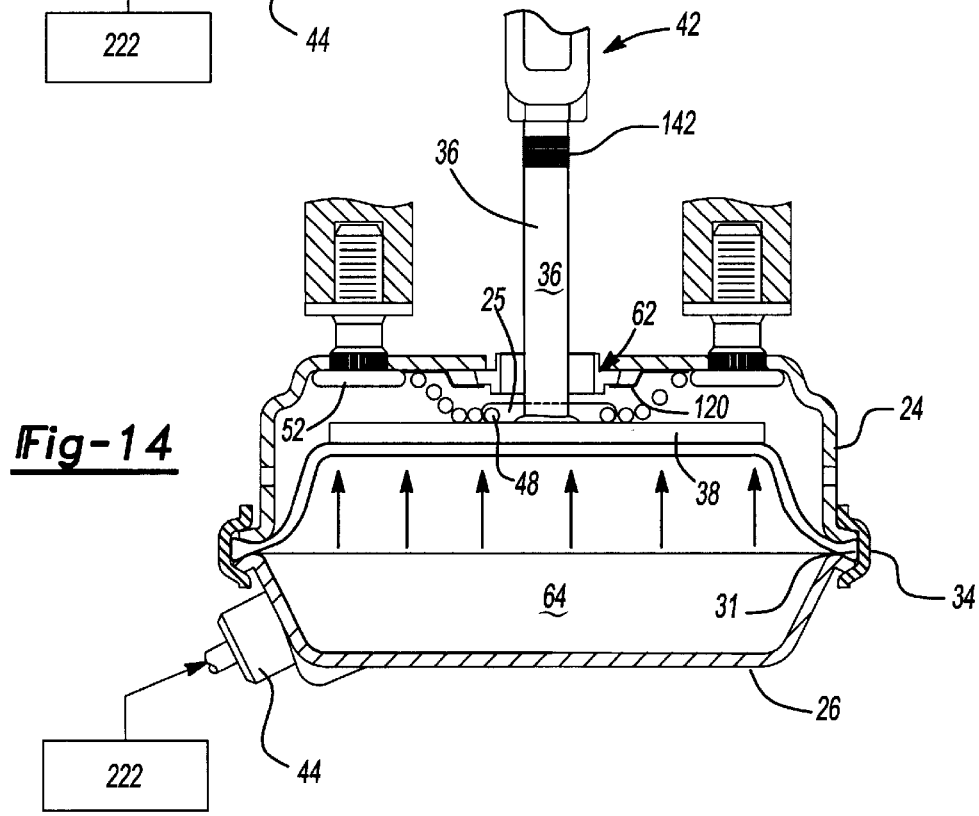
FIG. 14 illustrates a second step in the assembly of a brake monitor on a brake actuator by the assembly apparatus illustrated in FIG. 12.
Figure 15:
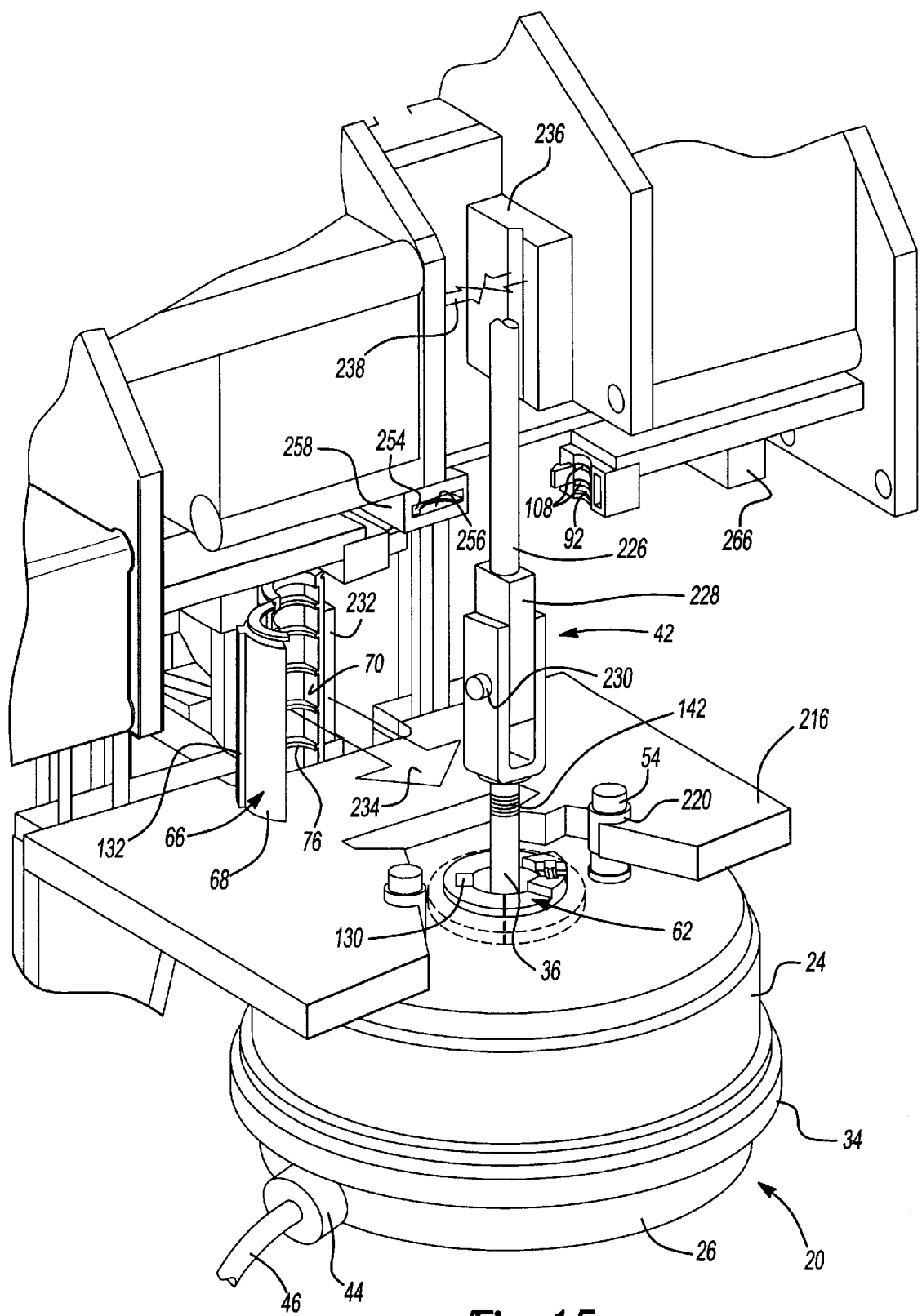
FIG. 15 is a side perspective view of a further step performed by the assembly apparatus illustrated in FIG. 12, wherein the push rod sleeve is assembled on the push rods.

FIGS. 13 and 14 illustrate the initial steps performed by the installation apparatus for receipt of the push rod sleeve 66. First, the inlet port 44 of the brake actuator 20 is pressurized by connecting the port to a source of air pressure 222 of the installation apparatus. The piston plate 38 will generally be spaced slightly from an internal stop 224 in the housing during attachment of the clamp 193 described above in reference to FIG. 8. As this space is depleted by pressurizing actuator 20, the pressure on claim 193 is released. The clamp member 193 is then removed by depressing the finger release lever 195. The push rod 36 then being in the fully extended or overstroke position as shown in FIG. 14 is ready for receipt of the push rod sleeve 66. As will be understood by those skilled in this art, there are various types of push rods of brake actuators including push rods having a clevis 42 at its distal end as described herein and push rods which are cylindrical and generally cut to length by the customer for particular applications. The installation apparatus of this invention is adapted to attach a sleeve member to a push rod having a clevis 42, wherein the diameter of the opening through the push rod sleeve is too small to telescopically receive an annular sleeve which is not hinged as described above with reference to FIG. 10. Further, the preferred embodiment of the installation apparatus 196 is adapted to calibrate the push rod sleeve and sensor element on brake actuators having different standard strokes as described below. As best shown in FIG. 15, where the push rod includes a clevis 42, a rod extension 226 is utilized to accommodate brake actuators having different standard or rated strokes. The rod extension includes a rectangular portion 228 which is received in the clevis 42 and retained by a clevis pin 230, which may be the clevis pin used in the installation of the brake actuator in a vehicle brake system. The purpose of the rod extension 226 will be described below in conjunction with the description of the operation of the installation apparatus.

Figure 17:
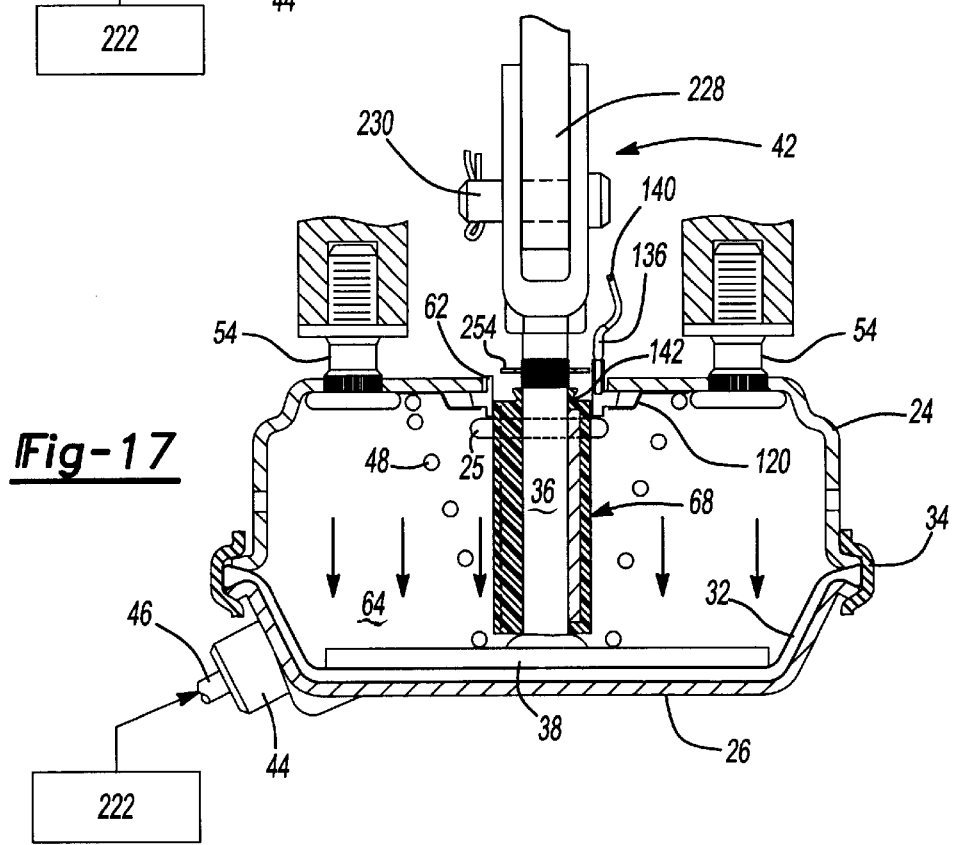

As best shown in FIG. 15, the push rod sleeve 66 in the open position is received in a push rod sleeve clamp member 232 which is configured to receive in press fit one of the semi-circular halves 70 and the clamp member 232 is extended by the apparatus control as shown by arrow 234 to extend the sleeve 66 around the push rod 36, wherein the male connectors 86 are received in the female connectors 84, locking the push rod sleeve 66 on the push rod 36 as shown in FIG. 16. The connectors are not shown in FIG. 15 for clarity, but are shown in FIG. 10 and described above. The push rod sleeve 66 is then locked on the push rod 36, but is slideable relative to the push rod as described above. The radial rib or key 132 of the push rod is then aligned with the keyway 130 of the sensor sleeve 62 and the push rod sleeve 66 and the air pressure from pneumatic source 222 is then removed or terminated, such that the piston plate is returned to the zero stroke condition as shown in FIG. 17, wherein the push rod sleeve is fully retracted. The sensor assembly including a Hall-effect sensor 136 is then inserted into sensor pocket 134 of the sensor sleeve 62 best shown in FIG. 3. The push rod sleeve 66 may then be adjusted on the push rod 36 to calibrate the sensor elements as described below.

First, the push rod extension 226 is clamped between the opposed V-blocks 236 best shown in FIG. 15 when the brake actuator is in the zero-stroke condition as shown in FIG. 17. That is, the source of pneumatic pressure 222 is off and the return spring 48 drives the piston plate 38 against the flexible diaphragm against the head or cover 26. The V-blocks 236 are extended by pneumatic pistons 240 shown in FIG. 12. The push rod 36 is thus locked to the center carriage 242 through the push rod extension 226 and the center carriage 242 is supported on the vertical rails 244 by slides 246. Thus, extension of the push rod 36 will lift the center carriage 242 on rails 244. The brake actuator is then pressurized by the source of air pressure 222 until the stop 248 shown in FIG. 12 engages the post 250. The distance "D" between stop 248 and post 250 is adjustable by the servo-motor drive unit 262, such that the distance between the stop member 248 and the adjustable post 250 is equal to the "standard" or rated stroke of the push rod 36 for the brake actuator. For example, for a brake actuator having a 2.25 in. stroke, distance "D" would be 1.70 in., for a brake actuator having a 2.5 in. stroke, the distance "D" would be 1.95 in. and for a brake actuator having a 3.0 in. stroke, distance "D" would be 2.45 in. Thus, the installation apparatus will accommodate any brake actuator regardless of the standard or rated stroke.

Next, the push rod sleeve 66 is adjusted on the push rod 36 to calibrate the sensor elements as now described. As shown in FIG. 10, the push rod sleeve 66 includes an annular groove 143 beneath the radial lip 144 which receives the lip 142 of the lock nut 91 to lock the push rod sleeve on the push rod following calibration. This annular groove 143 and lip 144 are utilized by the installation apparatus to adjust the push rod sleeve 66 axially on the push rod 36 and calibrate the sensor elements as described below. However, as will be understood by those skilled in this art, the installation apparatus may utilize any convenient surface on the push rod sleeve 66 to retain the sleeve during adjustment or the installation apparatus may grip the sleeve. The installation apparatus includes a reciprocal push rod sleeve clamp 254 best shown in FIG. 19 which extends from slot 256 in member 258 best shown in FIG. 15. The clamp member 254 includes a U-shaped reduced thickness end portion 260 which is received in the annular groove beneath the lip 144 of the push rod sleeve 66 as shown in FIG. 19. In the commercial embodiment of the installation apparatus, the apparatus includes a laser (not shown) to accurately locate the annular groove in the push rod sleeve. Upon receipt of the push rod sleeve clamp 254 in the annular groove 143 of the push rod sleeve as shown in FIGS. 18 and 19, the push rod sleeve 66 may be moved axially on the push rod by raising and lowering the outer bracket assembly 210 of the installation apparatus 196 shown in FIG. 12.

Figure 12:
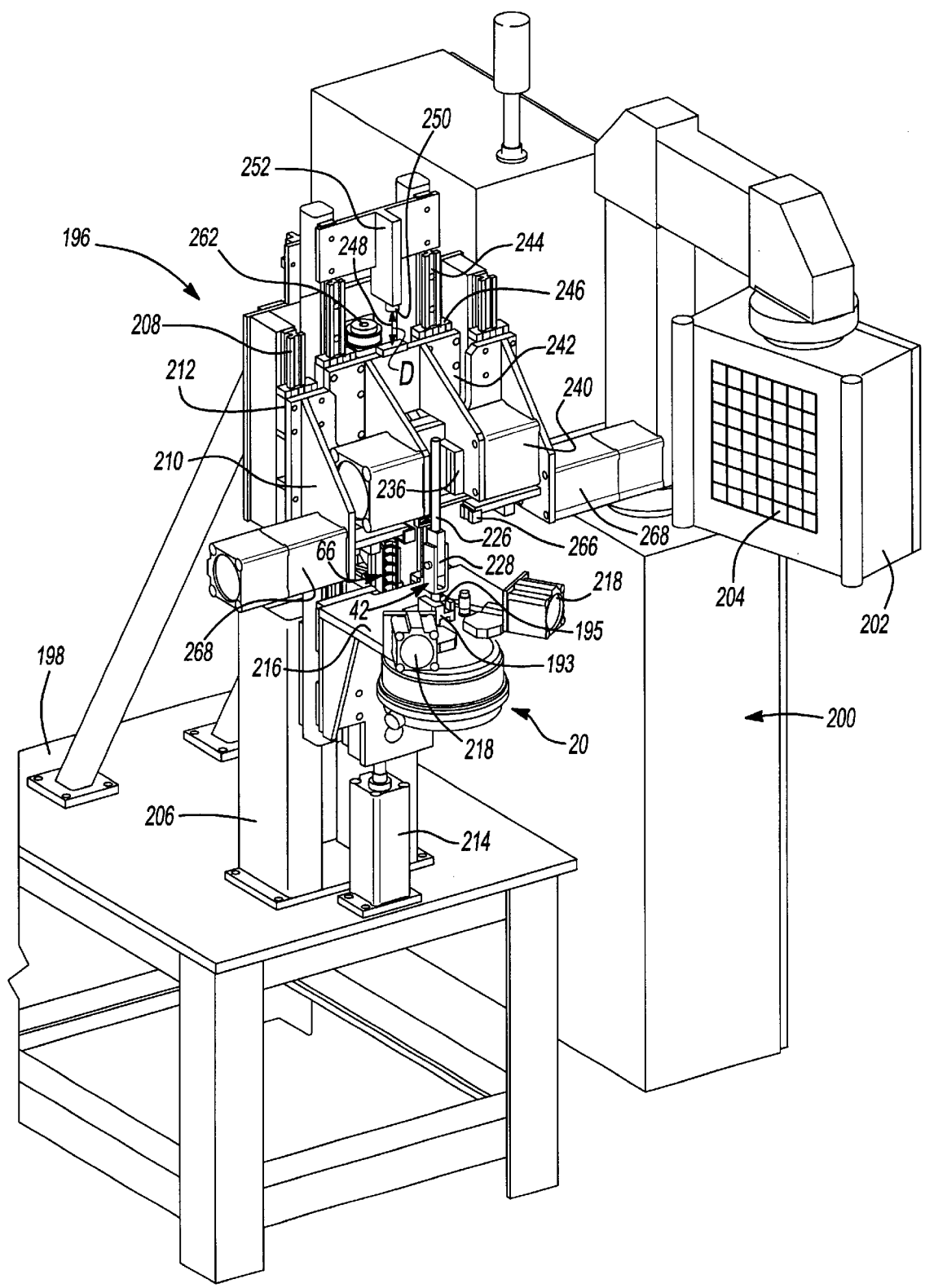
FIG. 12 is a perspective view of a second station of the apparatus for assembly of a brake monitor on a brake actuator of this invention.

In the second assembly station 196, the outer bracket assembly 210 may be raised and lowered on vertical rails 208 by servomotor drive unit 262 shown in FIG. 12. As will be understood by those skilled in this art, a servomotor drive unit conventionally includes a servomotor, which drives a precision ball screw and which is connected to the outer bracket assembly 210 by timing pulleys (not shown). The servomotor drive unit 262 is connected to the control unit 200 which, in the preferred embodiment, includes a programmable logic controller (PLC) having an analogue card which is connected to the Hall-effect sensor 136, such that the Hall-effect sensor continuously reads the voltage generated by the magnet 80 in the push rod sleeve 66. The computer control drive for the servomotor drive unit 262 initially moves the outer support and bracket assembly 210 relatively rapidly to a predetermined position of the push rod sleeve 66 on the push rod 36. The PLC then "hunts" by moving the push rod sleeve 66 up and down on push rod 36 as shown by arrow 264 until the sensor 136 senses a predetermined voltage from the magnet 80 as described above in regard to the assembly and operation of the brake monitoring system.

In the disclosed embodiment of the brake monitoring system as described above, the magnet 80 preferably includes north and south poles, 80 N and 80 S in FIG. 10 and a null-point 81 between the north and south poles of the magnet, wherein the magnetic field is zero. Thus, as described above, where the input voltage is five volts, the output voltage from the sensor will be 2.5 volts at the null-point or transition 81 between the north and south poles. The installation apparatus in the second station operates under the same principle. That is, the push rod clamp member 254 is moved up and down by the servomotor drive unit 262 until the output voltage from the Hall-effect sensor is 2.5 volts, which in the disclosed embodiment of the brake monitoring system is the standard or rated stroke of the brake actuator. Depending upon the rated stroke of the brake actuator, the null-point 81 of the magnet is located to indicate a full stroke. Thus, the second assembly station 196 of the apparatus for assembly of a brake monitor of this invention will adjust the push rod sleeve 66 axially on the push rod 36 until the sensor is located opposite the null-point of the magnet, which is the rated stroke of the brake actuator.

Finally, the second assembly station 196 shown in FIG. 12 locks the push rod sleeve 66 on the push rod as now described. As described above with regard to the assembly of the brake monitor, the push rod sleeve 66 is locked on the push rod by the generally semi-circular clamp members 92, each of which include a radial groove and the free end of the sleeve includes a rib 144 overlying the annular groove. The generally semi-circular clamp members 92 may be secured together by forcing the male connector portions 94 into the female sockets or connectors 96, which permanently interconnects the clamp members 92. The radial grooves 142 then bite into the resilient locking elements 108, securing the clamp to the push rod and accurately locating the sleeve 66 on the push rod 36. In the disclosed embodiment of the installation apparatus, the apparatus includes opposed clamp elements 266 which are reciprocated by pneumatic pistons 268 shown in FIG. 12. The clamp elements 266 are best shown in FIG. 15, wherein the clamp elements include semi-circular openings each of which receive a semi-circular clamp member 92 by press fit assisted by vacuum. Thus, when the installation apparatus has completed calibration of the brake monitoring system as described above, the clamp elements 266 are extended by pneumatic pistons 268 to permanently clamp the sleeve to the push rod in the predetermined location assuring accurate monitoring of the brake actuator 20. In the preferred embodiment, the push rod 36 includes a threaded portion 142, which may also be a checker board configuration, such that the locking inserts 108 of the clamping member maintain clamping force against the push rod as described above. In the preferred embodiment of the installation apparatus, the PLC of the computer control makes a final check of the location of the sensor sleeve 66 on the push rod 36 prior to removal of the brake actuator from the installation apparatus.

The installation apparatus of this invention thereby assures that the brake monitoring system will accurately monitor the position of the push rod as described above and assure accurate assembly of both the brake actuator and the brake monitoring system. As described above, the installation apparatus illustrated and described above positions the sensor sleeve 62 in the housing and accurately aligns the components of the push rod 36 including the push rod plate 38, the return spring 48 and the return spring guide 120 and maintains this alignment by compressing and locking the orientation in the first station of the apparatus as shown in FIGS. 1 to 8. The second station 196 of the assembly apparatus positions the push rod sleeve 66 on the push rod and the orientation between the sensor sleeve 62 and the push rod sleeve 66 is maintained by the key and keyway as described above. The installation apparatus further accurately calibrates the sensor elements by adjusting the push rod sleeve 66 on the push rod and the installation apparatus further permanently attaches the push rod sleeve 66 on the push rod 36 and locks the push rod sleeve in the calibrated position by attaching the locking member 91. The assembly apparatus of this invention avoids error and assures accurate monitoring of the brake actuator 20 with each installation. As will be understood by those skilled in this art, brake actuators for heavy duty vehicles are typically not made to close enough tolerances for accurate monitoring of the push rod stroke utilizing prior art monitoring systems. For example, the push rod 36 is conventionally welded to the piston plate 38 as shown in the Figures. Further, the housing components are formed from stamped metal parts and the diaphragm or diaphragms are clamped between the housing components. Finally, various components may be damaged during manufacture of the brake actuator. The installation apparatus of this invention assures that each brake monitor will accurately and continuously measure the stroke of the push rod with each brake actuator manufactured and will provide immediate evidence of a failed part, such as the return spring 48.

The assembly and operation of the brake monitoring system can now be described. First, the magnet 80 is assembled in the pocket 78 of the sleeve as shown in FIG. 10. In the disclosed embodiment, the magnet is slip fit into the pocket 78 which is dimensioned slightly larger than the external dimensions of the magnet. As described below, the magnet is magnetized to define north and south face poles or fields which are maintained opposite the sensor 138 as shown in FIG. 20. The sleeve 66 is then assembled on the push rod 36 by closing the opposed sleeve portions around the integral flexible hinge portion 72 around the push rod as shown by arrow 90 and sliding the longitudinal key 132 on the sleeve 66 into the keyway 130 of the sensor sleeve or stone shield. As set forth above, in the preferred embodiment, the receipt of the male connectors 82 on the sleeve in the female sockets or connectors 84 permanently attaches the free sides of the sleeve, preventing tampering or loosening of the connections. Generally, the sensor sleeve or stone shield 62 will be assembled in the brake actuator 20 when the brake actuator is assembled. That is, the components 122 and 124 are first preassembled and then received in the opening 60 of the case member 24 prior to receipt of the return spring 48 and the push rod 36, piston plate 38 and stone shield retainer 120 assembly. The diaphragm 32 is then received in the chamber 64 and the cover 26 is assembled on the peripheral edge 31 and the clamping member 34 is attached, clamping the diaphragm 32 as described above.

As described above, the annular push rod sleeve 66 is then adjusted on the push rod 36 prior to receipt of the annular clamp 91. As discussed below, the sensor 138 in combination with the magnet 80 is adapted to monitor and sense several conditions of the brake actuator, including an overstroke condition, a dragging brake, a nonfunctioning brake actuator and a normal stroke condition. Therefore, it is essential that the sleeve 66 and the magnet 80 be accurately located on the push rod and the location will depend upon the rated stroke of the push rod 36. Following adjustment of the sleeve 66 on the push rod, which as described above is accomplished by sliding the sleeve on the push rod, the sleeve is clamped on the push rod by the clamp members 92 as now described. As best shown in FIG. 2, the push rod 36 includes a plurality of spaced radial grooves 142 which are located on the push rod approximately where the clamp ring 91 should be attached. The generally semicircular clamp members 92 include a radial groove 142 and the free end of the sleeve includes a rib 144. The generally semicircular clamp members 92 are then secured by forcing the male connector portions 94 into the female sockets or connectors 96, which permanently interconnects the clamp members 92. The radial grooves 142 then bite into the resilient locking inserts 108, securing the clamp to the push rod and accurately locating the sleeve 66 on the push rod as shown in FIG. 2.

The integral sleeve 66 may be formed by injection molding a suitable plastic. The plastic must have sufficient flexibility to permit closure of the sleeve portions 68 and 70 around the integral hinge portion 72. Further, the plastic must be selected to withstand the adverse conditions encountered by a brake actuator, particularly the wide range of temperature variations. A brake actuator is typically rated for use in temperatures varying from –40° F. to +185° F. A suitable plastic for this application is a polypropylene copolymer, available from Amoco Corporation, No. 10-3434. The adjustable locking clamp 91 may also be formed of the same plastic material. However, the locking inserts 108 should be formed of a resilient material able to withstand the above-referenced temperature variations and preferably a plastic material which has no memory, such that the locking inserts will maintain clamping force against the push rod. A suitable material for the locking inserts is Krayton™ available from Shell Corporation. The sensor sleeve or stone shield 66 may also be formed of an elastomeric or plastic material, including the above-referenced polypropylene copolymer. As set forth above, the most preferred sensor 138 is a Hall-effect sensor which is available from several sources, including Allegro of Worchester, Mass.

The magnet 80 may be a continuous bar magnet, wherein the Hall-effect sensor continuously senses a magnetic field of the magnet to determine the position of the magnet in the annular sleeve 66. That is, each magnet has a specific magnetic profile from its north pole to its south pole and the Hall-effect sensor can determine the position of the magnet and sleeve by sensing the changing magnetic field. The data received by the Hall-effect sensor can then be processed through a computer and the visual indicators can then be used to provide a direct readout of the stroke of the push rod 36 on a continuous basis. In a disclosed embodiment, however, the need for a complex computer program for analyzing the location of the push rod and magnet has been eliminated by utilizing a unique magnet in this application which provides the data necessary to determine overstroke and dragging brake conditions as set forth below.

The preferred embodiment of the magnet 80 in this application is a magnet, wherein the face of the magnet opposite the sensor may be magnetized, such as a ceramic or ferrite magnet, such as a Grade 8 ceramic magnet available from Adams Magnetics of Elizabethtown, N.J. By using suitable jigs, as known in the art, a portion of one face may be magnetized with one magnetic field and the adjacent face may be magnetized with the opposite magnetic field. In the disclosed embodiment, one face 80N is magnetized with a north magnetic field and the adjacent face 80S is magnetized with a south magnetic field as shown in FIG. 4. The transition line 81 has no magnetic field. As will be understood by those skilled in this art, the face opposite face 80N will have a south magnetic field and the face opposite the face 80S will have a north magnetic field. Thus, the Hall-effect sensor 136 shown in FIG. 3, which is opposite the faces 80N and 80S of the magnet, can easily identify the magnetic fields 80N and 80S and the transition line 81 as the push rod 36 and the sleeve 66 reciprocate through the opening 60 of the housing. The length of the magnetic faces 80N and 80S and the transition line 81 will depend upon the stroke of the brake actuator. In a typical brake actuator having a 2.5 inch stroke, for example, the face 80S should be about 2 inches and the face 80N should be about ½ inch. Brake actuators of the type disclosed in this application generally have a stroke ranging from about 2.25 to 3 inches, wherein the face 80S should be approximately ¾ of the total length of the magnetic. In the fully retracted position of the push rod 36 and sleeve 66 or at zero stroke shown in FIG. 17, the sensor 138 is just off or above the end of the magnet 80. The preferred Hall-effect sensor is a ratio metric linear Hall-effect sensor, wherein the output is proportional to the input voltage and the applied magnetic field. In a disclosed embodiment, the input voltage is five volts. Thus, the output from the Hall-effect without the magnetic field is 50 percent or 2.5 volts. Thus, the output from the sensor in the fully retracted or rest position shown in FIG. 1 is 2.5 volts. Then, when the operator depresses the brake and the stoplight is on, pneumatic pressure through line 46 begins to invert the diaphragm 32, driving the piston plate 38, push rod 36 and the magnet 80 in the sleeve 66 through the opening 60 in the housing and the output voltage increases up to a maximum of 5 volts indicating a normal stroke condition. However, when the sensor is located opposite the transition line 81 between the faces having a south magnetic field and 80N having a north magnetic field, the output voltage from the sensor again decreases to 2.5 volts or less in the north magnetic field, indicating an overstroke condition. The output voltage drops further in the face 80N having a north magnetic field. Thus, the brake monitoring system of this invention can then indicate either a normal stroke condition or an overstroke condition. As will be understood, the sensor must also be connected to the brake light wiring.

The brake monitoring system of this invention can also sense a dragging brake condition, wherein the brake actuator does not fully retract to the zero stroke position shown in FIG. 17. As set forth above, when the operator releases the brake pedal, the pneumatic pressure through line 46 returns to zero and the return spring 48 urges the piston plate 38 downwardly in FIG. 20, withdrawing the push rod and the sleeve 66 to the position shown. If the brake light is not on and the return voltage from the sensor is 2.5 volts or less, the system indicates a dragging brake. A dragging brake is also indicated when the return voltage is greater than 2.8 volts. That is, the brake actuator did not return to its ready position. Further, the system may also be utilized to indicate a brake actuator failure. That is, if the system receives a signal that the brake light is on and the output voltage from the sensor is 2.5 volts or less, this indicates a brake failure. Finally, the sensor will also indicate a sensor fault, wherein the output voltage is 1 volt or less. Thus, the brake monitoring system of this invention will actually sense and indicate five functions of each brake actuators, including an overstroke condition, a dragging brake, a nonfunctioning brake actuator, normal stroke and sensor fault. These conditions may, for example, be easily monitored by the vehicle operator by flashing lights on the front of the trailer opposite the back window of the tractor or truck, such as green for normal stroke operation, red for overstroke, flashing red for dragging brake, et cetera. Alternatively, the sensors may be connected to a heads up display in the cab or a monitor in the cab. Thus, this embodiment of the invention including a single magnet having face portions opposite the sensors with opposite magnetic fields eliminates the requirement for a complex computer system, but simultaneously measures several conditions of each of the brake actuators.

As will be understood by those skilled in this art, various modifications may be made to the apparatus for assembling a brake monitor of this invention within the purview of the appended claims. For example, as set forth above, the brake monitor disclosed in this application may be assembled on any conventional brake actuator, including dual diaphragm spring brake actuators having an emergency chamber, brake actuators having a rolling diaphragm, etc. Further, the installation apparatus of this invention may be utilized to calibrate and affix the push rod sleeve on the push rod as described above, wherein the second sensor element, which is preferably a Hall-effect sensor is fixed relative to the brake actuator housing other than in a stone shield and may also be located outside the brake housing. Finally, the installation apparatus of this invention may be utilized to assemble various components of the brake monitoring system, wherein the remaining components are hand assembled on the brake actuator.

What is claimed is:

1. An Apparatus for assembling a brake monitor on a brake actuator, said brake actuator including a housing having an end wall, an opening through said end wall and a reciprocating piston within said housing having a push rod extending through said opening in said housing for actuation of a vehicle brake, said brake monitor including an annular push rod sleeve slideably received around said push rod having a first sensor element and a second sensor element fixed relative to said housing, said apparatus including an adjustment sleeve clamp member releasably supporting said push rod sleeve and movable by a servomotor relative to said brake actuator housing, a programmable logic controller operably connected to said second sensor element including a power supply having a predetermined voltage, and said programmable logic controller controlling said servomotor to adjust the axial position of said sleeve on said push rod relative to said second sensor element until said second sensor element senses a predetermined voltage.

2. The apparatus for assembling a brake monitor on a brake actuator as defined in claim 1, wherein said first sensor element is a magnet extending longitudinally in said push rod sleeve relative to said push rod and said second sensor element is a Hall-effect sensor, and said programmable logic controller including an analog card, whereby said Hall-effect sensor continuously reads the voltage of said magnet as said sleeve is adjusted axially by said servomotor.

3. The apparatus for assembling a brake monitor on a brake actuator as defined in claim 2, wherein said magnet has a magnetic surface opposite said Hall-effect sensor including north and south poles and a null point spaced from said north and south poles, said apparatus adjusting said sleeve axially on said push rod until said Hall-effect sensor senses said null point of said magnet.

4. The apparatus for assembling a brake monitor on a brake actuator as defined in claim 1, wherein said apparatus fixes said push rod sleeve on said push rod when said predetermined voltage is sensed by said second sensor element.

5. The apparatus for assembling a brake monitor on a brake actuator as defined in claim 4, wherein said apparatus fixes said push rod sleeve on said push rod by attaching a lock nut on said sleeve and said push rod, said lock nut fixing said push rod sleeve on said push rod.

6. The apparatus for assembling a brake monitor on a brake actuator as defined in claim 1, wherein said apparatus includes a reciprocating sleeve clamp configured to receive said push rod sleeve and said apparatus extending said sleeve clamp to dispose said sleeve around said push rod.

7. The apparatus for assembling a brake monitor on a brake actuator as defined in claim 6, wherein said push rod sleeve includes two generally semicircular polymeric sleeve components integrally hinged along one side edge and said sleeve clamp is configured to receive said push rod sleeve in an open configuration, said sleeve clamp then extending said push rod sleeve in said open configuration around said push rod and closes said push rod sleeve around said push rod.

8. The apparatus for assembling a brake monitor on a brake actuator as defined in claim 6, wherein said apparatus extends said push rod through said opening of said housing prior to receipt of said push rod sleeve on said push rod.

9. The apparatus for assembling a brake monitor on a brake actuator as defined in claim 1, wherein said piston includes a piston plate located within said housing and said brake actuator includes an annular sensor sleeve surrounding said push rod located within said housing and a return spring biased between said housing end wall and said piston plate, said apparatus disposing said annular sensor sleeve in said opening in said end wall, then receiving said push rod through said annular sensor sleeve and compressing said piston plate towards said end wall of said housing and locking said piston plate relative to said end wall with said retainer spring in a compressed state.

10. The apparatus for assembling a brake monitor on a brake actuator as defined in claim 1, wherein said apparatus may be adjusted to accommodate brake actuators having different push rod strokes.

11. The apparatus for assembling a brake monitor on a brake actuator as defined in claim 1, wherein said push rod sleeve includes a radial key and said brake actuator includes a sensor sleeve located within and fixed to said housing surrounding said push rod sleeve having a keyway slideably receiving said radial key of said annular member aligning said first and second sensor elements, said apparatus adjusting said axial position of said push rod sleeve relative to said sensor sleeve with said key slideably received in said keyway thereby maintaining alignment of said sensor elements.

12. An apparatus for assembling a brake monitor on a brake actuator, said brake actuator including an enclosed housing having an end wall, an opening through said end wall and a reciprocating piston within said housing having a push rod extending through said opening through said end wall of said housing for actuation of a vehicle brake, said brake monitor including an annular push rod sleeve slideably received around said push rod having an elongated magnet fixed to said push rod sleeve and a sensor fixed relative to said housing adjacent said opening, said apparatus including a calibration clamp member releasably supporting said sleeve and moveable by a servomotor relative to said brake actuator housing, a programmable logic controller including an analog card operably connected to said sensor including a power supply having a predetermined voltage, and said programmable logic controller controlling said servomotor to adjust the axial position of said push rod sleeve on said push rod and said magnet relative to said sensor until a predetermined voltage is sensed by said sensor and said apparatus then fixing said push rod sleeve on said push rod.

13. The apparatus for assembling a brake monitor on a brake actuator as defined in claim 12, wherein said sensor is a Hall-effect sensor which continuously reads the voltage of said magnet as said sleeve is adjusted axially by said servomotor.

14. The apparatus for assembling a brake monitor on a brake actuator as defined in claim 12, wherein said magnet has a magnetic surface opposite said sensor including north and south poles adjacent the ends of said magnetic surface and a null point spaced from one end of said magnet, and said apparatus adjusting said push rod sleeve and said magnet on said push rod until said sensor senses said null point.

15. The apparatus for assembling a brake monitor on a brake actuator as defined in claim 12, wherein said apparatus fixes said push rod sleeve on said push rod by attaching a locking member on said sleeve and said push rod.

16. The apparatus for assembling a brake monitor on a brake actuator as defined in claim 15, wherein said apparatus fixes said push rod sleeve on said push rod by attaching a lock nut on said sleeve and said push rod.

17. The apparatus for assembling a brake monitor on a brake actuator as defined in claim 12, wherein said apparatus includes a reciprocable sleeve clamp configured to receive said sleeve and said apparatus extending said sleeve clamp to receive said push rod sleeve around said push rod.

18. The apparatus for assembling a brake monitor on a brake actuator as defined in claim 17, wherein said push rod sleeve comprises two generally semicircular polymeric sleeve components hinged along one side edge and said sleeve clamp configured to receive said push rod sleeve in an open configuration, said apparatus extending said sleeve clamp to receive said push rod sleeve in said open configuration around said push rod and close said sleeve around said push rod.

19. The apparatus for assembling a brake monitor on a brake actuator as defined in claim 12, wherein said push rod sleeve includes a radial key and said brake actuator monitor includes an annular sensor sleeve located within said housing surrounding said push rod sleeve having a keyway slideably receiving said radial key of said sensor sleeve and aligning said magnet and said sensor, said apparatus adjusting said axial position of said push rod sleeve relative to said push rod with said key slideably received in said keyway maintaining said alignment of said magnet and said sensor.

20. The apparatus for assembling a brake monitor on a brake actuator as defined in claim 12, wherein said piston includes a piston plate located within said housing and said brake actuator includes an annular sensor sleeve surrounding said push rod sleeve, said apparatus positioning said sensor sleeve within said housing including said sensor and a return spring biased between said housing end wall and said piston plate, said apparatus compressing said piston plate towards said end wall of said housing and aligning and locking said piston plate to said push rod with said retainer spring in a compressed state prior to receipt of said push rod sleeve.

21. An apparatus for assembling a brake monitor on a brake actuator, said brake actuator including a housing having an end wall, an opening through said end wall and a reciprocating piston within said housing having a push rod extending through said opening in said end wall of said housing for actuation of a vehicle brake, said brake monitor including an annular push rod sleeve slideably received around said push rod having an elongated magnet fixed to said push rod sleeve extending longitudinally relative to said push rod, and a Hall-effect sensor fixed to said housing within the magnet field of said magnet, said apparatus including a push rod sleeve adjustment member releasably supporting said push rod sleeve and moveable by a servomotor relative to said brake actuator housing, a programmable logic controller having an analog card operably connected to said Hall-effect sensor including a power supply having a predetermined voltage, and said programmable logic controller controlling said servomotor to adjust the axial position of said push rod sleeve on said push rod and said magnet relative to said Hall-effect sensor until said Hall-effect sensor senses a predetermined voltage.

22. The apparatus for assembling a brake monitor on a brake actuator as defined in claim 21, wherein said magnet has a magnetic surface opposite said Hall-effect sensor including north and south poles and a null point spaced from said north and south poles, said apparatus adjusting said push rod sleeve axially on said push rod until said Hall-effect sensor senses said null point.

23. The apparatus for assembling a brake monitor on a brake actuator as defined in claim 21, wherein said apparatus locates said annular sensor sleeve within and fixed to said housing surrounding said push rod sleeve including said Hall-effect sensor, and one of said push rod sleeve and said sensor sleeve including a radial key and th e other of said push rod sleeve and said sensor sleeve including a keyway slideably receiving said key, said apparatus adjusting said axial position of said push rod sleeve with said key slideably received in said keyway maintaining the alignment of said magnet with said Hall-effect sensor during axial adjustment of said push rod sleeve on said push rod.

24. The apparatus for assembling a brake monitor on a brake actuator as defined in claim 21, wherein said apparatus fixes said push rod sleeve on said push rod by attaching a lock nut on said push rod sleeve and said push rod.

\* \* \* \* \*